(12) United States Patent
Mikami

(10) Patent No.: US 8,115,828 B2
(45) Date of Patent: Feb. 14, 2012

(54) IMAGE PROCESSING APPARATUS, FLICKER REDUCTION METHOD, IMAGING APPARATUS, AND FLICKER REDUCTION PROGRAM

(75) Inventor: Masanori Mikami, Kanagawa (JP)

(73) Assignee: Sony Corporation (JP)

( * ) Notice: Subject to any disclaimer, the term of this patent is extended or adjusted under 35 U.S.C. 154(b) by 426 days.

(21) Appl. No.: 12/380,543

(22) Filed: Feb. 27, 2009

(65) Prior Publication Data

US 2009/0219409 A1 Sep. 3, 2009

(30) Foreign Application Priority Data

Mar. 3, 2008 (JP) ................. P2008-051534

(51) Int. Cl.
*H04N 9/73* (2006.01)
(52) U.S. Cl. .............. 348/228.1; 348/226.1; 348/370
(58) Field of Classification Search ............ 348/208.12, 348/208.4, 222.1, 226.1, 227.1, 228.1, 241, 348/296, 297, 362, 364, 447, 607, 618, 619, 348/370
See application file for complete search history.

(56) References Cited

U.S. PATENT DOCUMENTS

| 7,034,870 | B2 * | 4/2006 | Nagaoka et al. ........... 348/228.1 |
| 2005/0157203 | A1 * | 7/2005 | Nakakuki et al. ............. 348/362 |
| 2006/0055823 | A1 * | 3/2006 | Kinoshita et al. ............. 348/511 |
| 2006/0061669 | A1 * | 3/2006 | Jang et al. .................. 348/226.1 |
| 2007/0052816 | A1 * | 3/2007 | Nomura et al. ............. 348/226.1 |
| 2009/0167894 | A1 * | 7/2009 | Nakaoka et al. ........... 348/226.1 |

FOREIGN PATENT DOCUMENTS

JP 2004-222228 A 8/2004

* cited by examiner

*Primary Examiner* — Lin Ye
*Assistant Examiner* — Chriss Yoder, III
(74) *Attorney, Agent, or Firm* — Lerner, David, Littenberg, Krumholz & Mentlik, LLP

(57) ABSTRACT

An image processing apparatus includes: an integrating unit integrating an input image signal over a time interval equal to one horizontal period or longer; a normalizing unit normalizing an integrated value obtained by the integrating unit, or a difference value in the integrated value between adjacent fields or frames; an extracting unit extracting a spectrum of the normalized integrated value or difference value; an estimating unit estimating a flicker component on a field-by-field basis or frame-by-frame basis from the extracted spectrum; a detecting unit detecting a deviation of the latest flicker component, from the estimated latest flicker component and one or more flicker components estimated in the past; a correcting unit correcting the latest flicker component on the basis of the detected deviation of the flicker component; and a computing unit computing a corrected flicker component and the input image signal so as to cancel out the corrected flicker component.

6 Claims, 24 Drawing Sheets

AMPLITUDE $G = \sqrt{re^2 + im^2}$

PHASE $\theta = \tan^{-1}(im/re)$

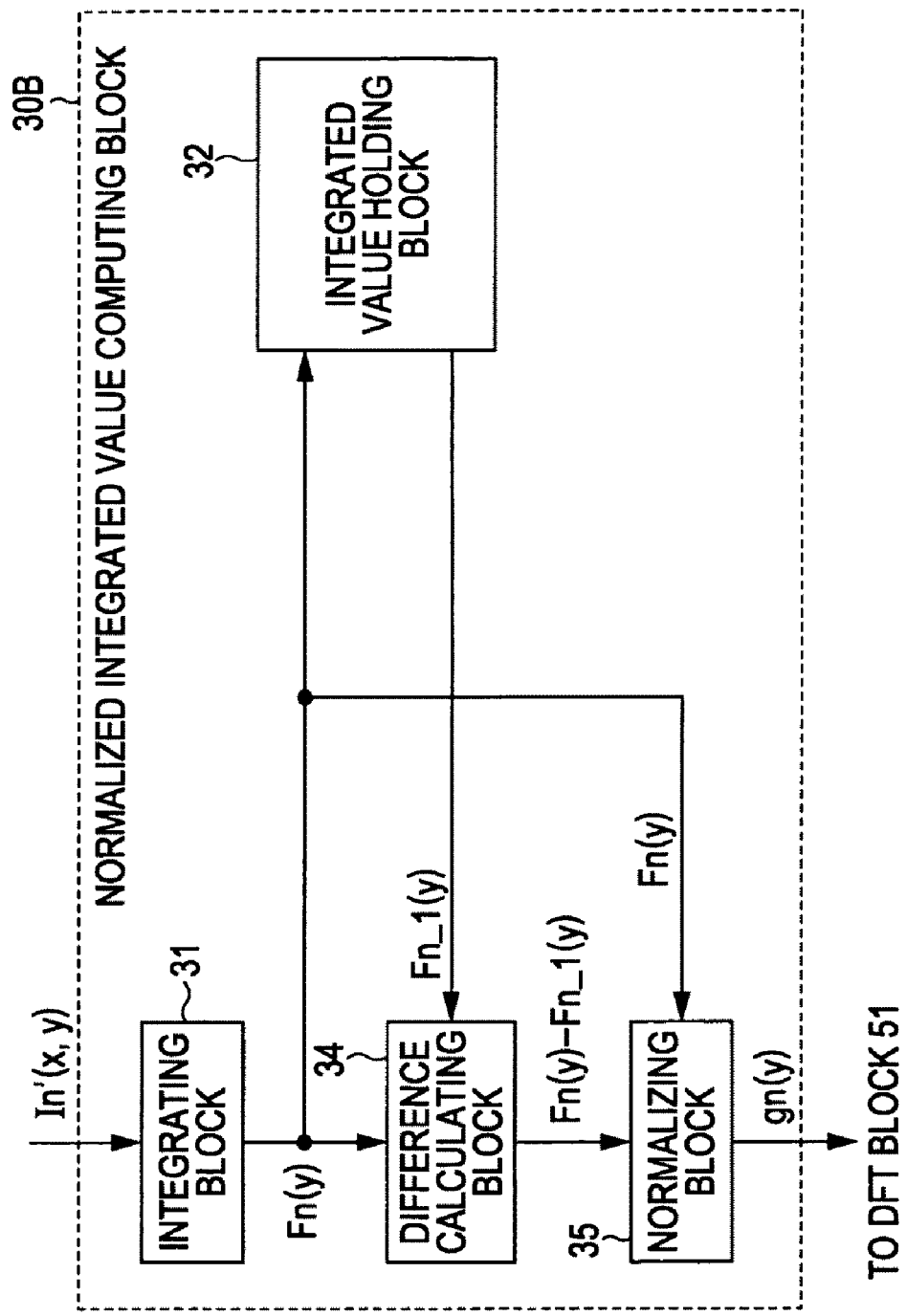

FIG. 11

$$In'(x,y) = [1 + \Gamma n(y)] * In(x,y) \qquad \cdots (1)$$

WHERE, $$\Gamma n(y) = \sum_{m=1}^{\infty} \gamma m * \cos[m * (2\pi/\lambda o) * y + \Phi mn]$$

$$= \sum_{m=1}^{\infty} \gamma m * \cos(m * \omega o * y + \Phi mn) \qquad \cdots (2)$$

$$\Delta \Phi mn = (-2\pi/3) * m \qquad \cdots (3)$$

$$Fn(y) = \sum_{X} In'(x,y) = \sum_{X} \{[1 + \Gamma n(y)] * In(x,y)\}$$

$$= \sum_{X} In(x,y) + \Gamma n(y) \sum_{X} In(x,y)$$

$$= \alpha n(y) + \alpha n(y) * \Gamma n(y) \qquad \cdots (4)$$

WHERE, $$\alpha n(y) = \sum_{X} In(x,y) \qquad \cdots (5)$$

FIG. 12

$$AVE[Fn(y)] = (1/3) \sum_{k=0}^{2} Fn\_k(y)$$

$$= (1/3) \left\{ \sum_{k=0}^{2} \alpha n\_k(y) + \alpha n\_k(y) * \Gamma n\_k(y) \right\}$$

$$= (1/3) \sum_{k=0}^{2} \alpha n\_k(y) + (1/3) \sum_{k=0}^{2} \alpha n\_k(y) * \Gamma n\_k(y)$$

$$= \alpha n(y) + (1/3) * \alpha n(y) \sum_{k=0}^{2} \Gamma n\_k(y)$$

$$= \alpha n(y) \qquad \cdots (6)$$

WHERE, $$\alpha n(y) \approx \alpha n\_1(y) \approx \alpha n\_2(y) \qquad \cdots (7)$$

---

$$Fn(y) - Fn\_1(y)$$

$$= \{\alpha n(y) + \alpha n(y) * \Gamma n(y)\} - \{\alpha n\_1(y) + \alpha n\_1(y) * \Gamma n\_1(y)\}$$

$$= \alpha n(y) * \{\Gamma n(y) - \Gamma n\_1(y)\}$$

$$= \alpha n(y) \sum_{m=1}^{\infty} \gamma m * \{\cos(m * \omega o * y + \Phi mn)$$

$$- \cos(m * \omega o * y + \Phi mn\_1)\}$$

$$\cdots (8)$$

FIG. 13

$$gn(y) = \{Fn(y) - Fn\_1(y)\} / AVE[Fn(y)]$$

$$= \sum_{m=1}^{\infty} \gamma m * \{\cos(m * \omega o * y + \Phi mn) - \cos(m * \omega o * y + \Phi mn\_1)\}$$

$$= \sum_{m=1}^{\infty} (-2) \gamma m \{\sin[m * \omega o * y + (\Phi mn + \Phi mn\_1)/2] * \sin[(\Phi mn - \Phi mn\_1)/2]\}$$

··· (9)

$$gn(y) = \sum_{m=1}^{\infty} (-2) \gamma m * \sin(m * \omega o * y + \Phi mn + m * \pi/3) * \sin(-m * \pi/3)$$

$$= \sum_{m=1}^{\infty} 2 * \gamma m * \cos(m * \omega o * y + \Phi mn + m * \pi/3 - \pi/2) * \sin(m * \pi/3)$$

$$= \sum_{m=1}^{\infty} 2 * \gamma m * \sin(m * \pi/3) * \cos(m * \omega o * y + \Phi mn + m * \pi/3 - \pi/2)$$

$$= \sum_{m=1}^{\infty} |Am| * \cos(m * \omega o * y + \theta m) \quad \cdots (10)$$

WHERE, $$|Am| = 2 * \gamma m * \sin(m * \pi/3) \quad \cdots (11a)$$

$$\theta m = \Phi mn + m * \pi/3 - \pi/2 \quad \cdots (11b)$$

FIG. 14

$$\gamma m = |Am| / [2 * \sin(m * \pi / 3)] \quad \cdots (12a)$$

$$\Phi mn = \theta m - m * \pi / 3 + \pi / 2 \quad \cdots (12b)$$

$$DFT[gn(y)] = Gn(m) = \sum_{i=0}^{L-1} gn(i) * W^{m*i} \quad \cdots (13)$$

WHERE, $$W = \exp[-j * 2\pi / L] \quad \cdots (14)$$

$$|Am| = 2 * |Gn(m)| / L \quad \cdots (15a)$$

$$\theta m = \tan^{-1}\{Im[Gn(m)] / Re[Gn(m)]\} \quad \cdots (15b)$$

WHERE,

Im[Gn(m)] : IMAGINARY PART
Re[Gn(m)] : REAL PART $$\gamma m = |Gn(m)| / [L * \sin(m * \pi / 3)] \quad \cdots (16a)$$

$$\Phi mn = \tan^{-1}\{Im[Gn(m)] / Re[Gn(m)]\} - m * \pi / 3 + \pi / 2$$
$$\cdots (16b)$$

$$In(x,y) = In'(x,y) / [1 + \Gamma n(y)] \quad \cdots (17)$$

FIG. 15

$$gn(y) = Fn(y) / AVE[Fn(y)]$$

$$= 1 + \sum_{m=1}^{\infty} \gamma_m * \cos(m * \omega_o * y + \Phi_{mn}) \quad \cdots (18)$$

$$gn(y) - 1 = \sum_{m=1}^{\infty} \gamma_m * \cos(m * \omega_o * y + \Phi_{mn})$$

$$= \sum_{m=1}^{\infty} |A_m| * \cos(m * \omega_o * y + \theta_m) \quad \cdots (19)$$

$$\gamma_m = 2 * |Gn(m)| / L \quad \cdots (20a)$$

$$\Phi_{mn} = \tan^{-1}\{Im[Gn(m)] / Re[Gn(m)]\} \quad \cdots (20b)$$

WHERE, $Im[Gn(m)]$ : IMAGINARY PART
$Re[Gn(m)]$ : REAL PART

UNDER FLUORESCENT LAMP LIGHTING

UNDER NON-FLUORESCENT LAMP LIGHTING

IMAGE PROCESSING APPARATUS, FLICKER REDUCTION METHOD, IMAGING APPARATUS, AND FLICKER REDUCTION PROGRAM

CROSS REFERENCES TO RELATED APPLICATIONS

The present application claims priority from Japanese Patent Application No. JP 2008-051534, filed in the Japanese Patent Office on Mar. 3, 2008, the entire content of which is incorporated herein by reference.

BACKGROUND OF THE INVENTION

1. Field of the Invention

The present invention relates to an apparatus, a method, and a program which reduce fluorescent lamp flicker that occurs in a video signal that is obtained from an imaging device in a case where a subject is shot by an XY address scanning type imaging device (imager/image sensor) such as a CMOS (Complementary Metal-Oxide Semiconductor) imaging device under the lighting of a fluorescent lamp.

2. Description of the Related Art

When a subject is shot with a video camera under the lighting of a fluorescent lamp that is directly lit by a commercial AC power supply, a temporal brightness variation, i.e., so-called fluorescent lamp flicker occurs in the video signal of a shooting output due to a difference between the frequency (twice the frequency of the commercial AC power supply) of the luminance variation (light quantity variation) of the fluorescent lamp and the vertical synchronization frequency of the camera.

For example, suppose a case in which, in a region where the frequency of the commercial AC power supply is 50 Hz, a subject is shot with a CCD camera of the NTSC system (vertical synchronization frequency: 60 Hz) under the lighting of a non-inverter fluorescent lamp. In this case, as shown in FIG. 22, one field frequency is $1/60$ second, whereas the period of the luminance variation of the fluorescent lamp is $1/100$ second. Hence, the exposure timing at each field is shifted with respect to the luminance variation of the fluorescent lamp, so the amount of exposure at each pixel varies from field to field.

Thus, for example, if the exposure time is $1/60$ second, the amount of exposure differs among time intervals a1, a2, and a3 even when the exposure time is the same, and when the exposure time is shorter than $1/60$ second (but not $1/100$ second as will be described later), the amount of exposure differs among time intervals b1, b2, and b3 even when the exposure time is the same.

Since the exposure timing with respect to the luminance variation of the fluorescent lamp reverts to the original timing every three fields, the brightness variation due to flicker is repeated every three fields. That is, the luminance ratio (how flicker appears) in each field varies depending on the exposure time interval, but the period of flicker does not vary.

It should be noted, however, that if the vertical synchronization frequency is 30 Hz in the case of a progressive camera such as a digital camera, the brightness variation is repeated every three frames.

Further, a fluorescent lamp typically uses a plurality of phosphors, for example, red, green, and blue phosphors to emit white light. However, these phosphors have their own unique persistence characteristics, and during the time interval from the stop of discharge to the start of the next discharge which exists within the period of luminance variation, their light emissions decay in accordance with their individual persistence characteristics. Thus, during this time interval, light appearing as white at first decays while gradually changing its hue. Thus, if the exposure timing is shifted as mentioned above, not only brightness variations but also hue variations occur. Since a fluorescent lamp has unique spectral characteristics such that a strong peak exists at a particular wavelength, variable components of the signal differ depending on the color.

So-called color flicker occurs due to such hue variations, and the differences in variable component among individual colors.

In contrast, if the exposure time is set to an integer multiple of the period ($1/100$ second) of the luminance variation of the fluorescent lamp as shown at the bottom of FIG. 22, the amount of exposure becomes constant regardless of the exposure timing and hence no flicker occurs.

In fact, a system has been conceived in which whether shooting is being done under fluorescent lamp lighting is detected by a user's operation or signal processing in a camera, and in the case of shooting under fluorescent lamp lighting, the exposure time is set to an integer multiple of $1/100$ second. According to this system, occurrence of flicker can be completely prevented by a simple method.

However, since this system does not allow the exposure time to be set in an arbitrary manner, the freedom of the exposure amount adjustment means for obtaining an appropriate amount of exposure is reduced. A method is thus desired which makes it possible to reduce fluorescent lamp flicker under an arbitrary shutter speed (exposure time).

This can be realized relatively easily in the case of an imaging apparatus in which all pixels on one screen are subjected to exposure at the same exposure timing, such as a CCD imaging apparatus, because brightness variations and color variations due to flicker appear only between fields.

For example, in the case of FIG. 22, if the exposure time is not an integer multiple of $1/100$ second, since flicker repeats in a period of three fields, flicker can be suppressed to a level that presents no practical problem, by predicting the current luminance and color variations from the video signal of three fields before, and adjusting the gains of the video signals of the individual fields in accordance with the prediction result so that the average value of the video signals of the individual fields becomes constant.

However, in the case of an XY address scanning type imaging device such as a CMOS imaging device, the exposure timing for each pixel is sequentially shifted by an amount corresponding to one period of the reading clock (pixel clock) in the horizontal direction of the screen, and all the pixels differ in exposure timing. Thus, flicker may not be suppressed sufficiently with the above-mentioned method.

FIG. 23 shows such a situation. As mentioned above, the exposure timing of each pixel is sequentially shifted in the horizontal direction of the screen as well. Since one horizontal period is sufficiently short in comparison to the period of the luminance variation of a fluorescent lamp, assuming that the exposure timings of pixels on the same line are the same, the exposure timings on individual lines in the vertical direction of the screen are shown. Such an assumption presents no practical problem.

As shown in FIG. 23, in an XY address scanning type imaging device, for example, a CMOS imaging device, the exposure timing differs for each line (F1 indicates this in a given field), and the amount of exposure differs in each line. Thus, brightness variations and color variations due to flicker occurs not only between fields but also within fields, which appear as a stripe pattern (the direction of the stripes themselves is the horizontal direction, and the direction of variation of the stripes is the vertical direction) on the screen.

FIG. 24 shows an on-screen flicker in a case where a subject has a uniform pattern. Since one period (one wavelength) of a stripe pattern is 1/100 second, a stripe pattern for 1.666 periods appears on one screen. Letting M represent the number of read lines per field, one period of the stripe pattern corresponds to the number of read lines L=M*60/100. It should be noted that in the specification and the drawings, an asterisk (*) is used as a symbol representing multiplication.

As shown in FIG. 25, this stripe pattern corresponds to five periods (five wavelengths) in three fields (three screens), and when viewed continuously, the stripe pattern appears to flow in the vertical direction.

FIGS. 24 and 25 show only a brightness variation due to flicker. In practice, however, the above-described color variation is also added, resulting in a considerable deterioration in image quality. A color flicker, in particular, becomes noticeable as the shutter speed becomes faster. In addition, in the case of an XY address scanning type imaging device, the influence of such color flicker appears on the screen, so the image quality deterioration becomes even more conspicuous.

In the case of such an XY address scanning type imaging device as well, if the exposure time can be set to an integer multiple of the period (1/100 second) of the luminance variation of a fluorescent lamp, the amount of exposure becomes constant regardless of the exposure timing, so fluorescent lamp flicker including on-screen flicker does not occur.

However, if the electronic shutter speed is made variable in a CMOS imaging device or the like, the imaging apparatus becomes complex. Further, even in the case of an imaging apparatus whose electronic shutter can be shut off freely, if the exposure time can be set to only an integer multiple of 1/100 second to prevent flicker, the freedom of the exposure amount adjusting means for achieving an appropriate exposure is reduced.

Accordingly, there have been proposed various methods for reducing fluorescent lamp flicker unique to an XY address scanning type imaging device such as a CMOS imaging device. For example, Japanese Unexamined Patent Application Publication No. 2004-222228 discloses an invention in which fluorescent lamp flicker unique to an XY address scanning type imaging device such as a CMOS imaging device can be detected with high accuracy and reliably and sufficiently reduced solely by simple signal processing without performing complicated processing such as detecting a flicker component by using a light receiving device, regardless of a subject or the level of a video signal, the type of a fluorescent lamp, and the like.

SUMMARY OF THE INVENTION

In the case of the technique described in Japanese Unexamined Patent Application Publication No. 2004-222228 described above, under normal shooting conditions, fluorescent lamp flicker unique to an XY address scanning type imaging device such as a CMOS imaging device can be detected with high accuracy and reliably and sufficiently reduced solely by simple signal processing. However, in the case of the technique described in Japanese Unexamined Patent Application Publication No. 2004-222228 described above, the difference between frames of an input image signal is used for the detection of a flicker component.

Thus, in the case of an imaging apparatus to which the invention according to Japanese Unexamined Patent Application Publication No. 2004-222228 is applied, when a difference occurs in image between frames due to a tilt (tilting) operation for changing the shooting direction in the vertical direction or a pan (panning) operation for changing the shooting direction in the lateral direction, or due to motion of a subject, it may become difficult to correctly detect a flicker component.

It is thus desirable to appropriately detect a flicker component even when a variation occurs in subject image component between frames, thereby making it possible to reliably and sufficiently reduce flicker at all times, in the case of a system in which fluorescent lamp flicker unique to an XY address scanning type imaging device such as a CMOS imaging device is detected with high accuracy and reduced solely by simple signal processing by using the difference between frames of an input image signal for the detection of a flicker component.

According to an embodiment of the present invention, there is provided an image processing apparatus including: integrating means for integrating an input image signal over an interval of time equal to or longer than one horizontal period, the input image signal being a video signal that can possibly contain a flicker component with a variation pattern synchronized with a field period or a frame period; normalizing means for normalizing an integrated value obtained by the integrating means, or a difference value in the integrated value obtained by the integrating means between adjacent fields or frames; extracting means for extracting a spectrum of the integrated value or the difference value normalized by the normalizing means; estimating means for estimating a flicker component on a field-by-field basis or a frame-by-frame basis from the spectrum extracted by the extracting means; detecting means for detecting a deviation of the latest flicker component, from the latest flicker component estimated by the estimating means and one or more flicker components estimated in the past by the estimating means; correcting means for correcting the latest flicker component on the basis of the deviation of the flicker component detected by the detecting means; and computing means for computing a corrected flicker component and the input image signal so as to cancel out the flicker component corrected by the correcting means.

With the image processing apparatus according to the above embodiment of the present invention, as the normalized integrated value or difference value, signal components other than the flicker component are removed through the integrating means, the normalizing means, and the extracting means. Thus, the flicker component is estimated easily and with high accuracy irrespective of the subject, even in a region such as a black background part or a low illumination part with a very small amount of flicker component.

A deviation due to the influence of a tilt operation, a pan operation, or the like which is contained in the thus estimated flicker component is detected by the detecting means. Then, a correction based on the deviation detected by the detecting means is performed by the correcting means on the latest flicker component to be corrected. Thereafter, by using the correcting flicker component, the flicker component is removed from the input image signal by the computing means.

Thus, for example, even in a case when a deviation is contained in flicker component due to a large change in subject component following a tilt operation, a pan operation, or the like, this deviation is appropriately corrected, thereby allowing a flicker reduction process to be performed with high accuracy.

According to an embodiment of the present invention, even when an image varies between fields or between frames, a flicker component is appropriately detected so that fluorescent lamp flicker unique to an XY address scanning type

BRIEF DESCRIPTION OF THE DRAWINGS

FIG. 10 is a diagram illustrating another configuration example of a normalized integrated value computing block of a flicker reduction unit;

FIG. 11 is a diagram showing equations used for explaining respective examples;

FIG. 12 is a diagram showing equations used for explaining respective examples;

FIG. 13 is a diagram showing equations used for explaining respective examples;

FIG. 14 is a diagram showing equations used for explaining respective examples;

FIG. 15 is a diagram showing equations used for explaining respective examples;

DESCRIPTION OF THE PREFERRED EMBODIMENTS

Figure 1:
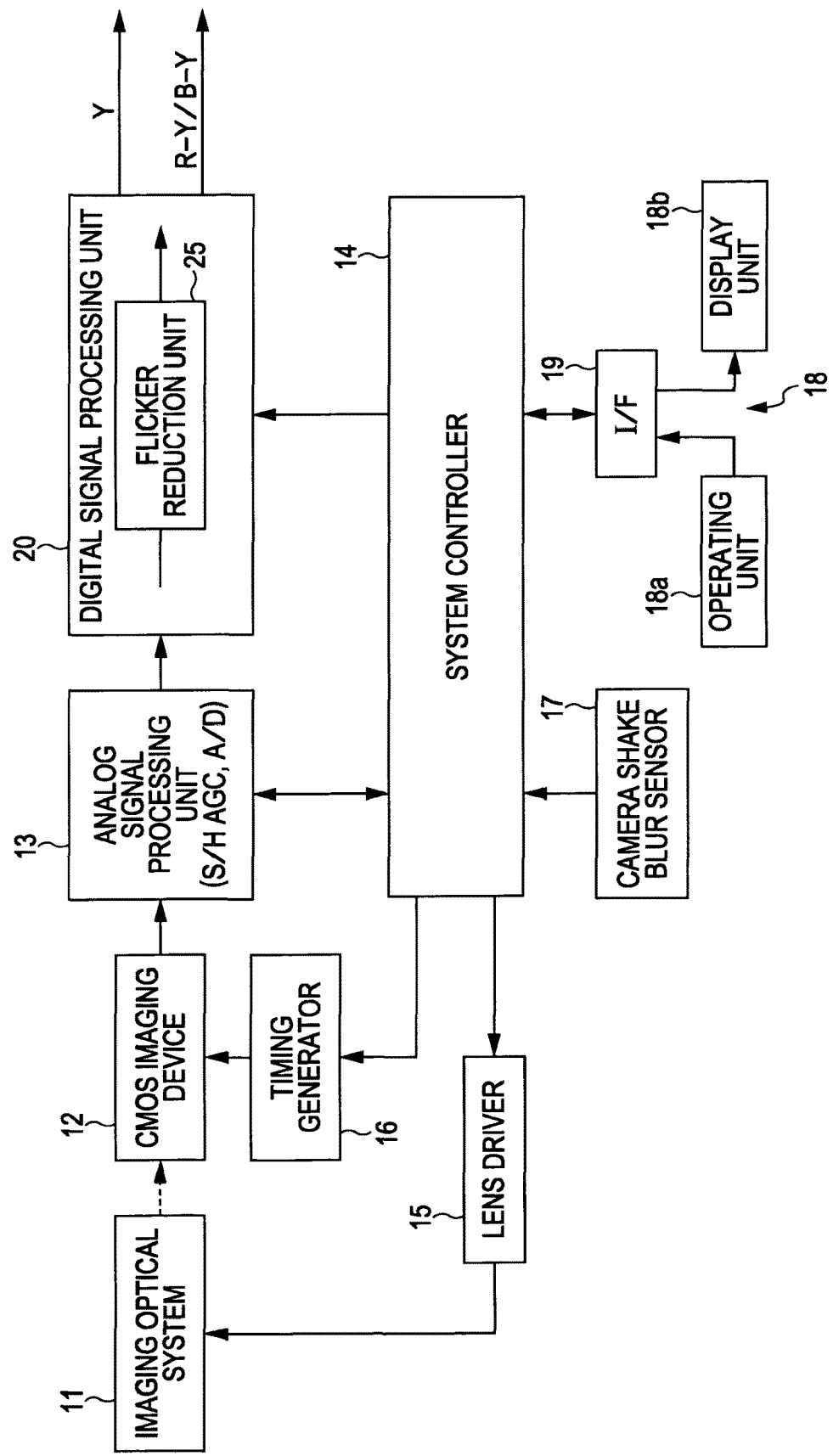
FIG. 1 is a diagram showing the system configuration of an imaging apparatus according to an embodiment of the present invention.
Figure 2:
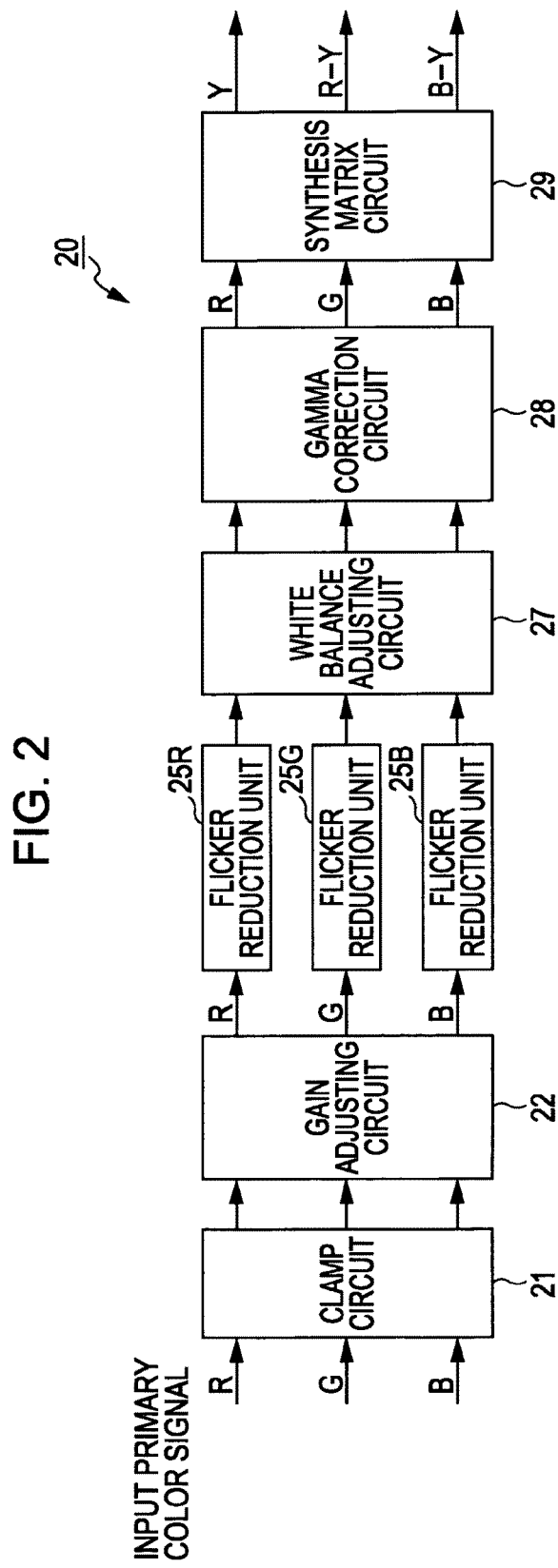
FIG. 2 is a diagram showing an example of a digital signal processing unit of a primary color system.
Figure 3:
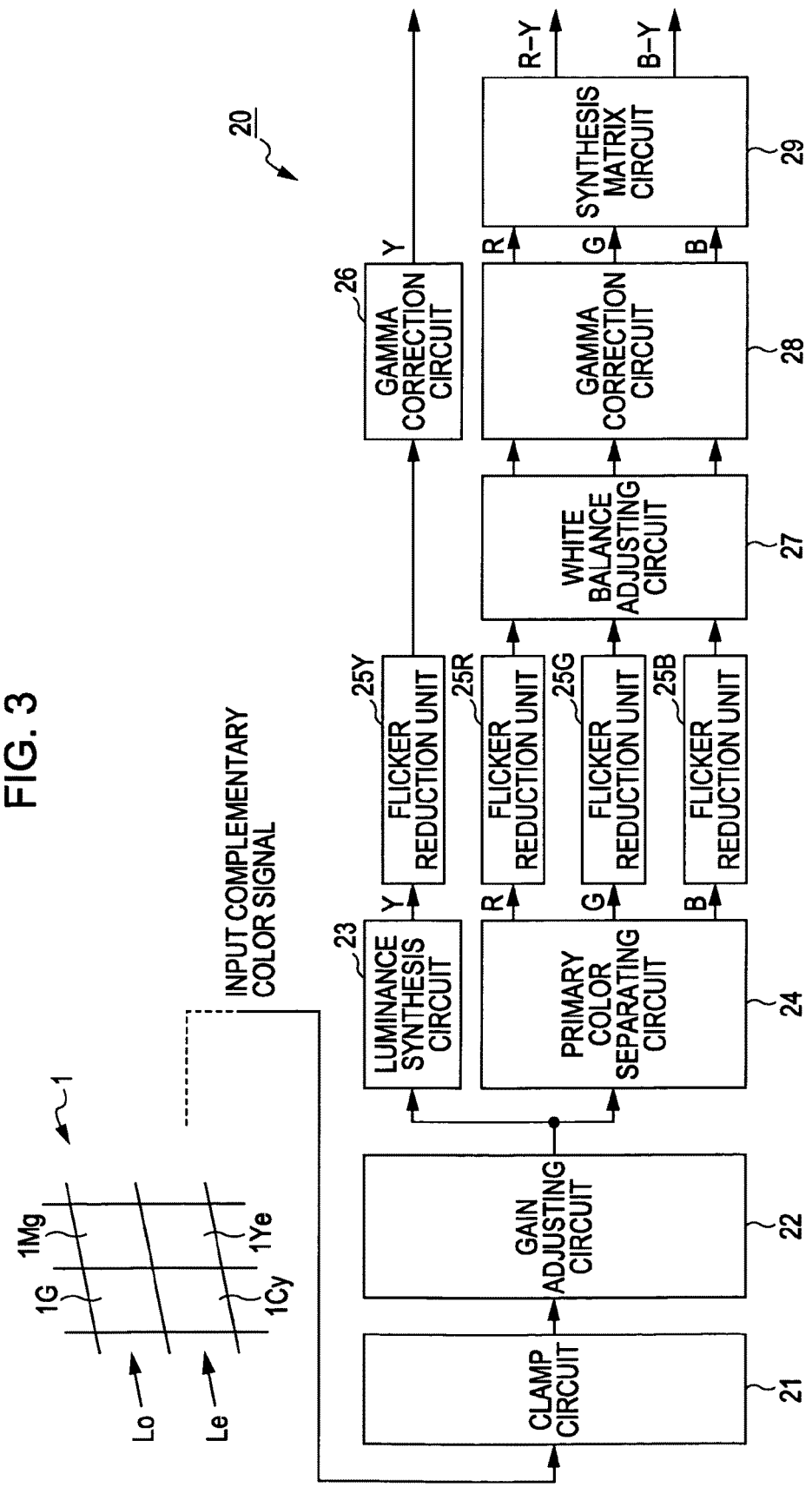
FIG. 3 is a diagram showing an example of a digital signal processing unit of a complementary color system.

[Embodiment of Imaging Apparatus: FIGS. 1 to 3]
(System Configuration: FIG. 1)

FIG. 1 shows the system configuration of an imaging apparatus according to an embodiment of the present invention, illustrating the case of a video camera using a CMOS imaging device as an XY address scanning type imaging device.

In the imaging apparatus according to this embodiment, that is, in a video camera, light from a subject is made incident on a CMOS imaging device 12 via an imaging optical system 11, and undergoes photo-electric conversion in the CMOS imaging device 12. An analog video signal is thus obtained from the CMOS imaging device 12.

The CMOS imaging device 12 has, on a CMOS substrate, a two-dimensional array of a plurality of pixels each having a photodiode (photogate), a transfer gate (shutter transistor), a switching transistor (address transistor), an amplifying transistor, a reset transistor (reset gate), and the like, and also a vertical scanning circuit, a horizontal scanning circuit, and a video signal outputting circuit.

As will be described later, the CMOS imaging device 12 may be either of a primary color type and a complementary color type. An analog video signal obtained from the CMOS imaging device 12 is a primary color signal of each of RGB colors or a color signal of a complementary color type.

The analog video signal from the CMOS imaging device 12 is sample-and-held for each color signal in an analog signal processing unit 13 configured as an IC (Integrated Circuit), has its gain controlled by AGC (Automatic Gain Control), and is converted into a digital signal by A/D conversion.

The digital video signal from the analog signal processing unit 13 is supplied to a digital signal processing unit 20 configured as an IC. As will be described later, the digital signal processing unit 20 applies various corrections and adjustments to the digital video signal. In addition, by acting in cooperation with a system controller 14, a flicker reduction unit 25 in the digital signal processing unit 20 reduces a flicker component by a method according to an embodiment of the present invention for each signal component as will be described later, and then finally converts the digital signal into a luminance signal Y, and color difference signals R-Y and B-Y of red and blue and outputs these signals.

The system controller 14 is configured by a microcomputer or the like, and controls individual units of a camera. As described above, the system controller 14 performs various processes, other than the process of removing a flicker component from a digital video signal to be processed, by acting in cooperation with the flicker removing unit 25 of the digital signal processing unit 20.

Specifically, a lens drive control signal is supplied from the system controller 14 to a lens driver 15 configured by an IC, and the lens of the imaging optical system 11 is driven by the lens driver 15.

Also, a timing control signal is supplied from the system controller 14 to a timing generator 16. Various kinds of timing signal are supplied from the timing generator 16 to the CMOS imaging device 12 to drive the CMOS imaging device 12.

Further, a detection signal of each signal component is taken in from the digital signal processing unit 20 to the system controller 14. On the basis of an AGC signal from the system controller 14, the gain of each color signal is controlled in the analog signal processing unit 13 as mentioned above, and also signal processing in the digital signal processing unit 20 is controlled by the system controller 14.

Also, the system controller 14 is connected with a camera shake blur sensor 17, and can also perform a camera shake blur correction on the basis of the detection output of the camera shake blur sensor 17.

Also, the system controller 14 is connected with an operating unit 18a and a display unit 18b that constitute a user interface 18, via an interface 19 configured by a microcomputer or the like. A setting operation, a selecting operation, or the like on the operating unit 18a is detected by the system controller 14, and the setting status, the control status, or the like of the camera is displayed on the display unit 18b by the system controller 14.

In a case where a flicker reduction process described later is not necessary, this is detected by the system controller 14, and the flicker reduction unit 25 is controlled as will be described later.

(Case of Primary Color System: FIG. 2)

FIG. 2 shows an example of the digital signal processing unit 20 in the case of a primary color system.

The primary color system has a decomposition optical system in which the imaging optical system 11 in FIG. 1 separates light from a subject into color light of each of RGB colors, and is a three-plate system having CMOS imaging devices for the respective colors of RGB as the CMOS imaging device 12, or a one-plate system having as the CMOS imaging device 12 one CMOS imaging device having color filters for the respective colors of RGB sequentially arrayed in repetition for each one pixel on the light incidence plane in the horizontal direction of the screen. In this case, primary color signals for the respective colors of RGB are read in parallel from the CMOS imaging devices 12.

In the digital signal processing unit 20 in FIG. 2, the black level of an input RGB primary color signal is clamped to a predetermined level in a clamp circuit 21. The gain of the clamped RGB primary color signal is adjusted in a gain adjusting circuit 22 in accordance with the amount of exposure. As will be described later, a flicker component in the gain-adjusted RGB primary color signal is reduced in each of flicker reduction units 25R, 25G, and 25B, by a method according to an embodiment of the present invention which is realized by cooperation with the system controller 14.

Further, in the digital signal processing unit 20 in FIG. 2, the white balance of the flicker-removed RGB primary color signal is adjusted in a white-balance adjusting circuit 27. The gray scale of the white-balance-adjusted RGB primary color signal is converted in a gamma correction circuit 28, and an output luminance signal Y and output color difference signals R-Y and B-Y are generated from the gamma-corrected RGB primary color signal in a synthesis matrix circuit 29.

In a primary color system, in general, the luminance signal Y is generated after all of the processing on the RGB primary color signal is finished as shown in FIG. 2. Thus, by reducing a flicker component in the RGB primary color signal in the course of processing on the RGB primary color signal as shown in FIG. 2, flicker components in both the individual color components and the luminance component can be sufficiently reduced.

It should be noted that while it is desirable to arrange the flicker reduction units 25R, 25G, and 25B as shown in FIG. 2, the manner of their arrangement is not necessarily limited to this.

(Case of Complementary Color System: FIG. 3)

FIG. 3 shows an example of the digital signal processing unit 20 in the case of a complementary color system.

The complementary color system is a one-plate system having, as the CMOS imaging device 12 in FIG. 1, one CMOS imaging device having a color filter of a complementary color type formed on the light incidence plane. In a color filter of a complementary color type, for example, as indicated as a color filter 1 in FIG. 3, at each given one horizontal line position Lo, a color filter part 1G for green and a color filter part 1Mg for magenta are sequentially arrayed in repetition for each one pixel in the horizontal direction, and at each another horizontal line position Le, a color filter part 1Cy for cyan and a color filter part 1Ye for yellow are sequentially arrayed in repetition for each one pixel in the horizontal direction.

In this case, video signals at two adjacent horizontal line positions are synthesized and read from the CMOS imaging device 12. Therefore, in each horizontal period, in the case of FIG. 3, a synthesized signal of a green color signal and a cyan color signal, and a synthesized signal of a magenta color signal and a yellow color signal are obtained the CMOS imaging device 12 for every one pixel clock.

In the digital signal processing unit 20 in FIG. 3, the black level of the complementary color signal is clamped to a predetermined level, the gain of the clamped complementary color signal is adjusted in the gain adjusting circuit 22 in accordance with the amount of exposure, a luminance signal Y is generated in a luminance synthesis circuit 23 from the gain-adjusted complementary color signal, and an RGB primary color signal is generated in a primary color separating circuit 24 from the gain-adjusted complementary color signal.

Further, in the digital signal processing unit 20 in FIG. 3, a flicker component in the luminance signal Y from the luminance synthesis circuit 23 is reduced in the flicker reducing unit 25Y by a method according to an embodiment of the present invention, which is realized by cooperation with the system controller 14 as will be described later. Also, in each of the flicker reducing units 25R, 25G, 25B, a flicker component in the RGB primary color signal from the primary color separating circuit 24 is reduced by a method according to an embodiment of the present invention, which is realized by cooperation with the system controller 14 as will be described later.

Further, in the digital signal processing unit 20 in FIG. 3, the gray scale of the flicker-reduced luminance signal is corrected, thus obtaining the output luminance signal Y, the white balance of the flicker-reduced RGB primary color signal is adjusted in the white balance adjusting circuit 27, the gray scale of the white-balance-adjusted RGB primary color signal is converted in the gamma correction circuit 28, and color difference signals R-Y and B-Y are generated from the gamma-corrected RGB primary color signal in the synthesis matrix circuit 29.

In the complementary color system, a luminance signal and an RGB primary color signal are generated at a relatively upstream stage of the digital signal processing unit 20 as shown in FIG. 3. This is because the luminance signal can be generated easily by a simple addition process from the above-mentioned synthesized signal, and also because if an RGB primary color signal is generated by a differential process from the above-mentioned synthesized signal, and the luminance signal is generated from the RGB primary color signal, the S/N of the luminance signal deteriorates.

However, in a case where separate processing systems are provided for luminance and color signals, only reducing flicker components in individual color components is not sufficient to reduce a flicker component in the luminance component. It is only when the flicker component in the luminance component is reduced separately as shown in FIG.

3 that it becomes possible to sufficiently reduce the flicker components in both the individual color components and the luminance component.

It should be noted that while it is desirable to arrange the flicker reduction units 25Y, and 25R, 25G, and 25B as shown in FIG. 3, the manner of their arrangement is not necessarily limited to this.

[Embodiment of Flicker Reduction Method: FIGS. 4 to 21]

Although differing in the target processing signal, the flicker reduction units 25R, 25G, and 25B in FIG. 2, and the flicker reduction units 25Y, 25R, 25G, and 25B in FIG. 3 are configured in the same manner. Accordingly, in the following, the flicker reduction units 25R, 25G, 25B, and 25Y will be generically referred to as flicker reduction unit 25.

Also, in the following, an input image signal is an RGB primary color signal or luminance signal whose flicker has not been reduced and which are inputted to the flicker reduction unit 25, and an output image signal is an RGB primary color signal or luminance signal whose flicker has been reduced and which are outputted from the flicker reduction unit 25.

Figure 23:
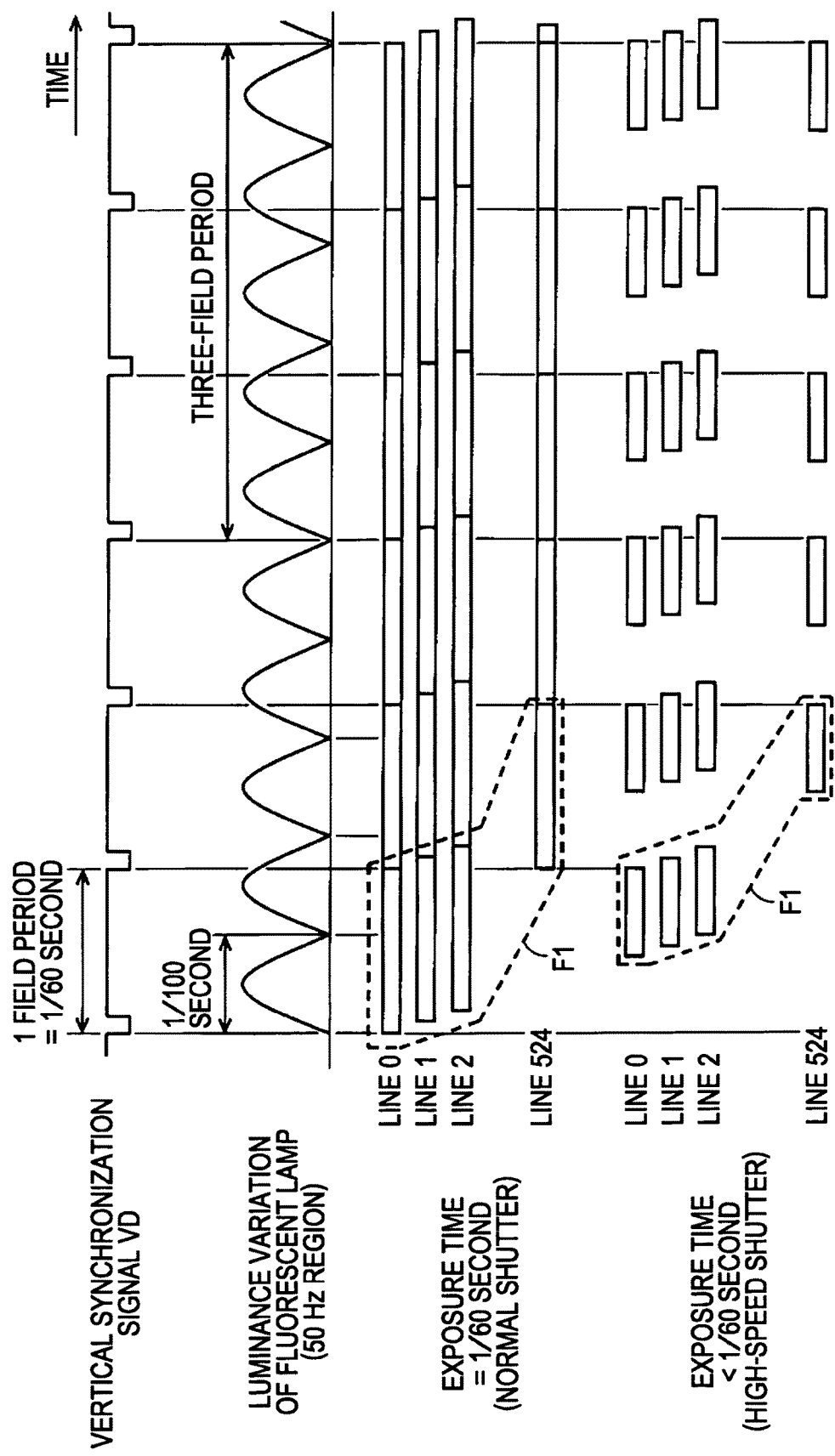
FIG. 23 is a diagram used for explaining fluorescent lamp flicker in the case of an XY address scanning type imaging device.
Figure 24:
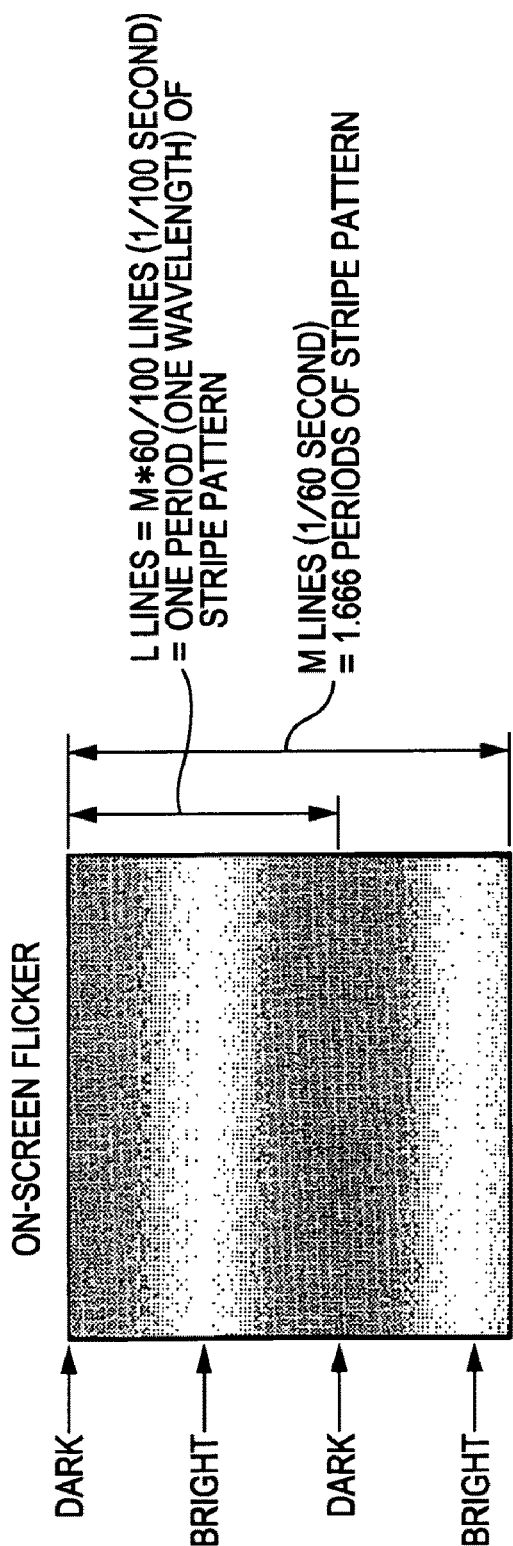
FIG. 24 is a view showing a stripe pattern of fluorescent lamp flicker on one screen in the case of an XY address scanning type imaging device.
Figure 25:
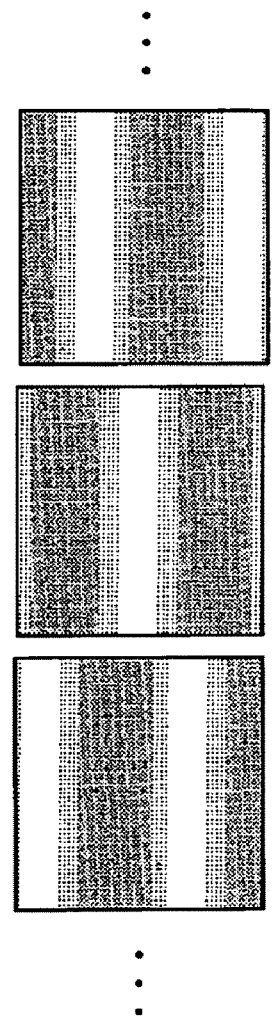
FIG. 25 is a view showing a stripe pattern of fluorescent lamp flicker over three screens in the case of an XY address scanning type imaging device.

Also, the following example is directed to a case in which, for example, in a region where the commercial AC power supply frequency is 50 Hz, a subject is shot with a CMOS camera of the NTSC (National Television System Committee) system (the vertical synchronization frequency: 60 Hz) under the lighting of a fluorescent lamp, therefore, in a case when fluorescent lamp flicker is not to be reduced, as shown in FIGS. 23 to 25, brightness variations and color variations due to flicker occur not only between fields but also within a field, which appears as a strip pattern equivalent to five periods (five wavelengths) over three fields (three wavelengths) on the screen.

In the case of a non-inverter fluorescent lamp as well as an inverter fluorescent lamp, flicker occurs if rectification is not sufficient. The present invention is thus not limited to a non-inverter fluorescent lamp.

Figure 4:
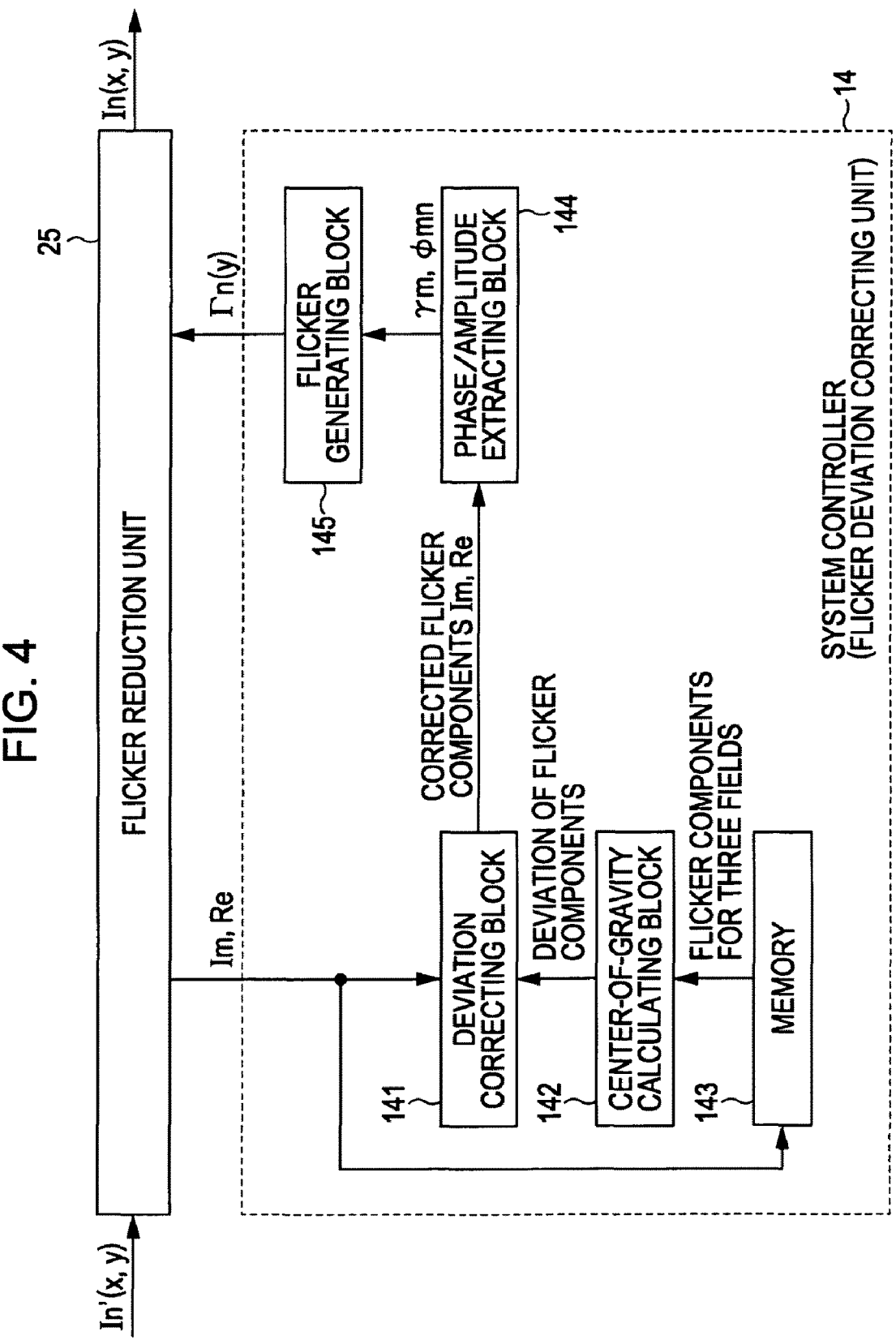
FIG. 4 is a block diagram illustrating a flicker reduction unit and a system controller which perform a flicker reduction process in cooperation with each other.

As described above, by acting in cooperation with the system controller 14, the flicker reduction unit 25 reduces a flicker component mixed in an image signal. FIG. 4 is a block diagram illustrating the flicker reduction unit 25 and the system controller 14 which perform a flicker reduction process in cooperation with each other.

As shown in FIG. 4, a flicker component mixed in an image signal can be reduced with high accuracy by the functions of the flicker reduction unit 25 of the digital signal processing unit 20 and of a flicker deviation correcting unit realized by the system controller 14. The following provides an overview of the functions of the flicker reduction unit 25 that performs a process of reducing flicker, and the flicker deviation correction unit that is realized by the system controller 14.

In the flicker reduction unit 25, first, a flicker component contained in an image signal supplied to the flicker reduction unit 25 is estimated (detected), and data Im (imaginary part), Re (real part) obtained by expressing this in the complex plane is supplied to the flicker deviation correcting unit realized by the system controller 14.

There are cases where a difference occurs in subject component between adjacent fields (screens) as the video camera is tilted or panned, or as the subject moves greatly. It is considered that when a difference occurs in subject component in this way, it may become difficult to appropriately detect a flicker component in the flicker reduction unit 25.

Accordingly, in the video camera according to this embodiment, the flicker deviation correcting unit realized by the system controller 14 detects a deviation with respect to the flicker component itself that is generated as a difference occurs in subject component between adjacent fields. Then, the system controller 14 corrects the deviation of the flicker component on the basis of the detected deviation of the flicker component itself, forms a flicker coefficient $\Gamma n(y)$ on the basis of this corrected flicker component, and returns this to the flicker reduction unit 25.

The flicker reduction unit 25 applies a flicker reduction process to an image signal supplied to the flicker reduction unit 25, on the basis of the flicker coefficient $\Gamma n(y)$ from the flicker deviation correcting unit realized by the system controller 14.

As described above, in the video camera according to this embodiment, the flicker reduction unit 25 does not perform a flicker component reduction process by using the detected flicker component directly. After correcting a deviation due to a tilt operation or a pan operation, or due to an abrupt movement of a subject which is contained in the detected flicker component, the flicker reduction unit 25 can perform a flicker reduction process with high accuracy on the basis of the corrected flicker component.

(Specific Example of Flicker Reduction Method: FIGS. 5 to 8B)

Next, the respective configurations and operations of the flicker reduction unit 25 shown in FIG. 4, and the flicker deviation correcting unit realized by the system controller 14 will be specifically described.

(Flicker Reduction Unit 25)

Figure 5:
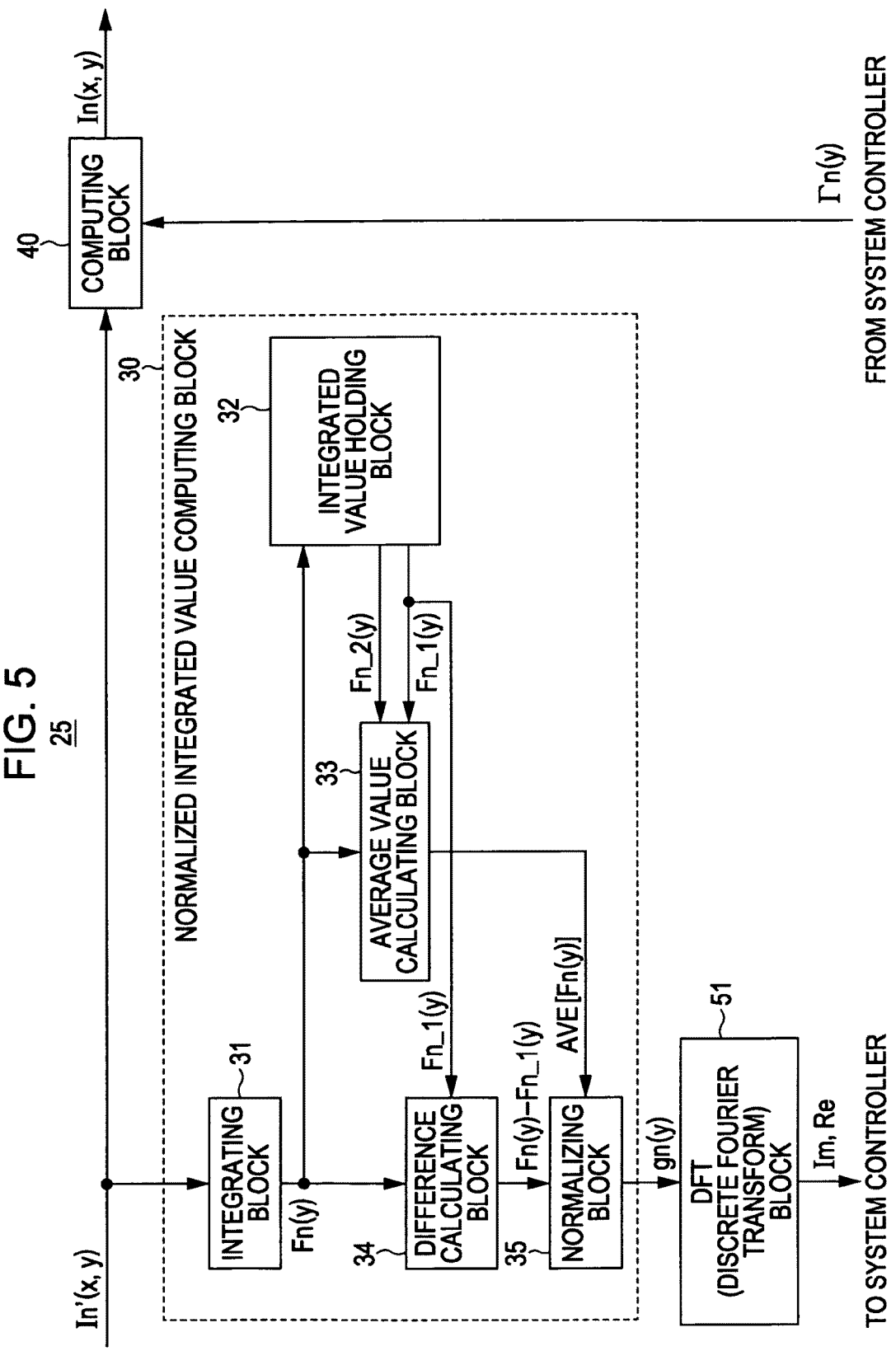
FIG. 5 is a diagram illustrating a flicker reduction unit.

FIG. 5 shows a first example of the flicker reduction unit 25.

FIGS. 24 and 25 show a case in which a subject is uniform. In general, a flicker component is proportional to the signal intensity of a subject.

Accordingly, letting the input image signal (RGB primary color signal or luminance signal before undergoing a flicker reduction process) in an arbitrary field n and in an arbitrary pixel (x, y) with respect to an ordinary subject be $In'(x, y)$, $In'(x, y)$ is represented by Equation (1) in FIG. 11 as the sum of a signal component that contains no flicker component, and a flicker component proportional thereto.

$In(x, y)$ represents a signal component, $\Gamma n(y)*In(x, y)$ represents a flicker component, and $\Gamma n(y)$ represents a flicker coefficient. Since one horizontal period is sufficiently short in comparison to the light emission period (1/100 second) of a fluorescent lamp, and the flicker coefficient can be regarded as constant on the same line in the same field, the flicker coefficient is represented by $\Gamma n(y)$.

As represented by Equation (2) in FIG. 11, $\Gamma n(y)$ is expressed by Fourier series for generalization. Thus, the flicker coefficient can be expressed in a form that accounts for all of emission characteristics and persistence characteristics that differ in accordance with the kind of the fluorescent lamp.

In Equation (2), $\lambda o$ represents the wavelength of the on-screen flicker shown in FIG. 24. Letting M represent the number of read lines per field, $\lambda o$ is equivalent to L (=M*60/100) lines. $\omega o$ represents a normalization angular frequency normalized by $\lambda o$.

$\gamma m$ represents the amplitude of a flicker component of each order (m=1, 2, 3, ...). $\Phi mn$ represents the initial phase of the flicker component of each order, and is determined by the light emission period (1/100 second) and exposure timing of a fluorescent lamp. Since $\Phi mn$ reverts to the same value every three fields, the difference in $\Phi mn$ from the immediately preceding field is determined by Equation (3) in FIG. 11.

<Computation and Retention of Integrated Value>

In the example of FIG. 5, first, in order to reduce the influence of a picture pattern for the purpose of detecting flicker, the input image signal $In'(x, y)$ is integrated over one line in the horizontal direction of the screen by an integration block 31, thus computing an integrated value Fn(y) as indicated by Equation (4) in FIG. 11. αn(y) in Equation (4) indicates an integrated value of the signal component In(x, y) over one line, as indicated by Equation (5) in FIG. 11.

The integrated value Fn(y) thus computed is stored and held in an integrated value holding block 32 for the purpose of detecting flicker in subsequent fields. The integrated value holding block 32 is configured to be capable of holding integrated values for at least two fields.

If a subject is uniform, the integrated value αn(y) of the signal component In(x, y) becomes constant. It is thus easy to extract a flicker component αn(y)*Γn(y) from the integrated value Fn(y) of the input image signal In'(x, y).

However, in the case of a typical subject, since αn(y) also contains a m*ωo component, it is not possible to separate between luminance and color components as flicker components, and luminance and color components as the signal components of the subject itself, so it is difficult to purely extract only a flicker component. Further, the flicker component in the second term is very small relative to the signal component in the first term in Equation (4), so most of the flicker component is buried in the signal component.

Figure 17:
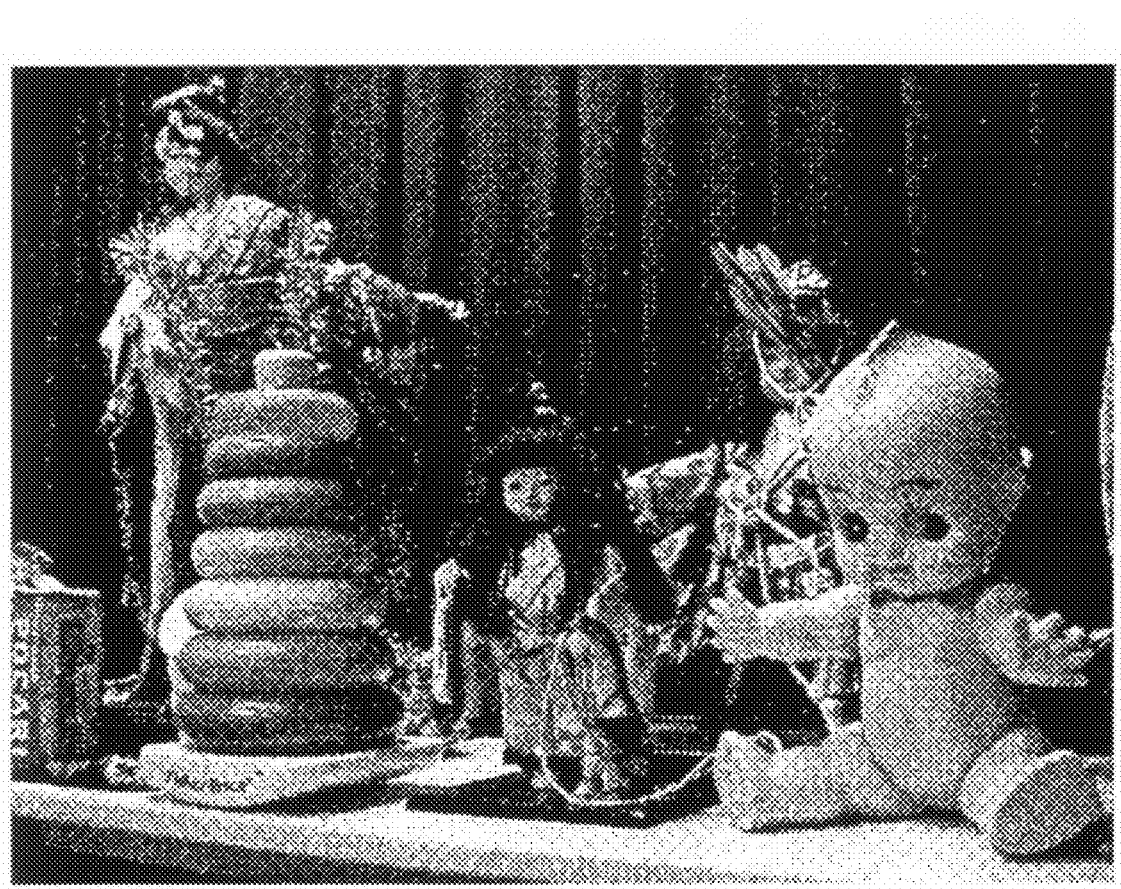
FIG. 17 is a view showing a subject used in a test.
Figure 18:
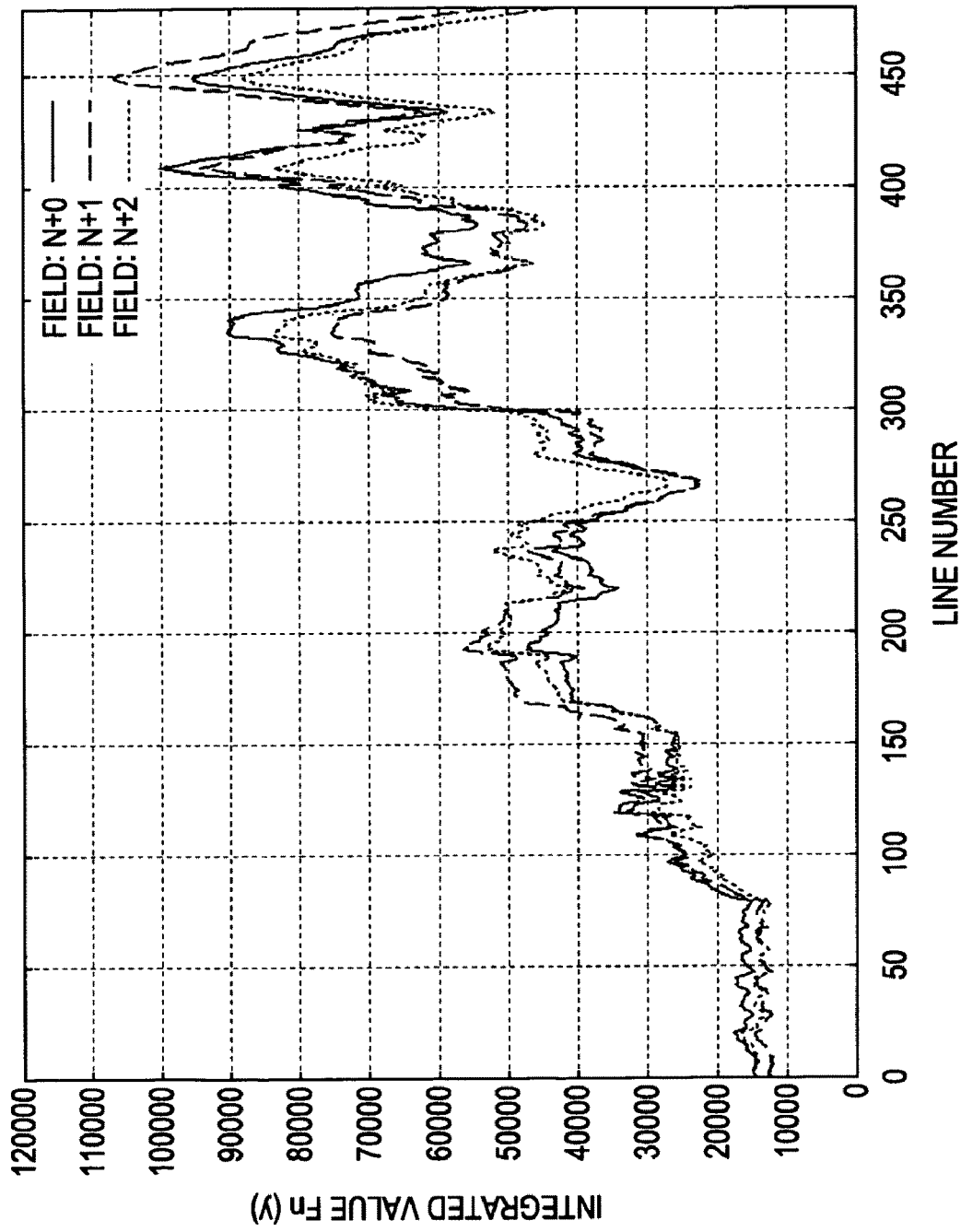
FIG. 18 is a diagram showing integrated values in the case of the subject in FIG. 17.

For reference, FIG. 18 shows the integrated values Fn(y) in three consecutive fields with respect to a subject (a color subject in actuality) shown in FIG. 17. FIG. 18 is directed to a red signal, and Field: N+0 (solid line), Field: N+1 (dashed line), and Field: N+2 (dotted line) represent first, second, and third fields of three consecutive fields. As can be appreciated from FIG. 18 as well, it is not possible to extract a flicker component directly from the integrated value Fn(y).

<Average Value Calculation and Difference Calculation>

Accordingly, in the example of FIG. 5, integrated values in three consecutive fields are used to remove the influence of αn(y) from the integrated value Fn(y).

That is, in this example, at the time of computing the integrated value Fn(y), an integrated value Fn_1(y) on the same line as that one field before, and an integrated value Fn_2(y) on the same line as that two fields before are read from the integrated value holding block 32. An average value calculating block 33 calculates an average value AVE[Fn(y)] of the three integrated values Fn(y), Fn_1(y), and Fn_2(y).

If the subject can be regarded as being substantially the same during the three consecutive fields, αn(y) can be regarded as the same value. If the motion of the subject is sufficiently small among the three consecutive fields, this assumption presents no practical problem. Further, from the relationship represented by Equation (3), computing the average value of integrated values in the three consecutive fields means adding together signals with the phases of their flicker components sequentially shifted by (−2π/3)*m. As a result, the flicker components cancel out each other. Therefore, the average value AVE[Fn(y)] is represented by Equation (6) in FIG. 12.

It should be noted, however, that the above is directed to the case of computing the average value of integrated values in three consecutive fields under the assumption that the approximation of Equation (7) in FIG. 12 holds. If the motion of the subject is large, the approximation of Equation (7) does not hold.

Accordingly, the flicker reduction unit 25 that assumes a case where the motion of a subject is large may simply hold integrated values over at least three fields in the integrated value holding block 32, and compute the average value of integrated values over at least four fields including the integrated value Fn(y) in the current field. Thus, through the low pass filter action with respect to the time axis direction, an influence due to a moving object is reduced.

However, since flicker is repeated every three fields, to cancel out flicker components, it is necessary to compute the average value of integrated values in j (an integer multiple, greater than two times, of 3, i.e., 6, 9 . . . ) consecutive fields. The integrated value holding block 32 is thus configured to hold integrated values for at least (j−1) fields. It should be noted that, as will be described later, there may be a case where a deviation that is too large to be canceled out even by the flicker reduction unit 25 that assumes cases where the motion of a subject is large is mixed into the flicker component. However, even in such a case, a large deviation mixed into the flicker component can be effectively removed by the function of the flicker deviation correcting unit used in an embodiment of the present invention described later.

FIG. 5 is directed to a case where it is assumed that the approximation of Equation (7) in FIG. 12 holds. Further, in this example, a difference calculating block 34 calculates a difference between the integrated value Fn(y) of the current field from the integrating block 31, and the integrated value Fn_1(y) of one field before from the integrated value holding block 32. The difference value Fn(y)−Fn_1(y) represented by Equation (8) in FIG. 12 is thus computed. Equation (8) is also based on the assumption that the approximation of Equation (7) holds.

Figure 19:
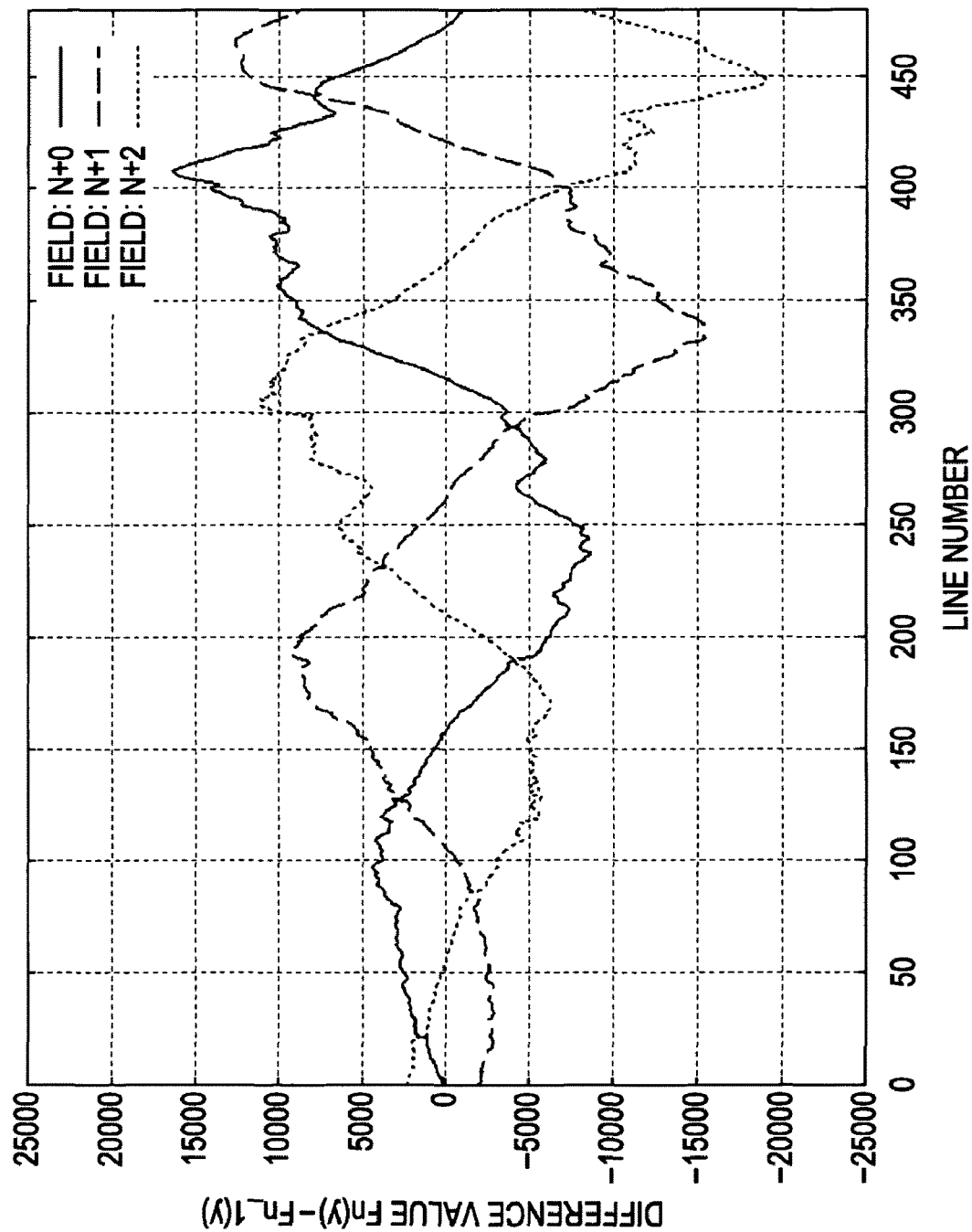
FIG. 19 is a diagram showing difference values in the case of the subject in FIG. 17.

FIG. 19 shows the difference value Fn(y)−Fn_1(y) for three consecutive fields with respect to the subject shown in FIG. 17. As can be appreciated from this, the influence of the subject is sufficiently removed from the difference value Fn(y)−Fn_1(y), so flicker components (flicker coefficients) appear more clearly than in the case of the integrated value Fn(y) shown in FIG. 18.

<Normalization of Difference Value>

Further, in the example of FIG. 5, the difference value Fn(y)−Fn_1(y) from the difference calculating block 34 is normalized in a normalizing block 35 by being divided by the average value AVE[Fn(y)] from the average value calculating block 33, and the normalized difference value gn(y) is computed.

The normalized difference value gn(y) is expanded as represented by Equation (9) in FIG. 13 using Equations (6) and (8) in FIG. 12 and the sum-to-product formula of trigonometry, and is further represented by Equation (10) in FIG. 13 from the relationship of Equation (3) in FIG. 11. |Am| and θm in Equation (10) are respectively represented by Equations (11a) and (11b).

In the difference value Fn(y)−Fn_1(y), since the influence of the signal intensity of the subject remains, the levels of luminance variations and color variations due to flicker differ depending on the region. However, through the normalization mentioned above, the luminance variations and color variations due to flicker can be set to the same level over the entire region.

Figure 20:
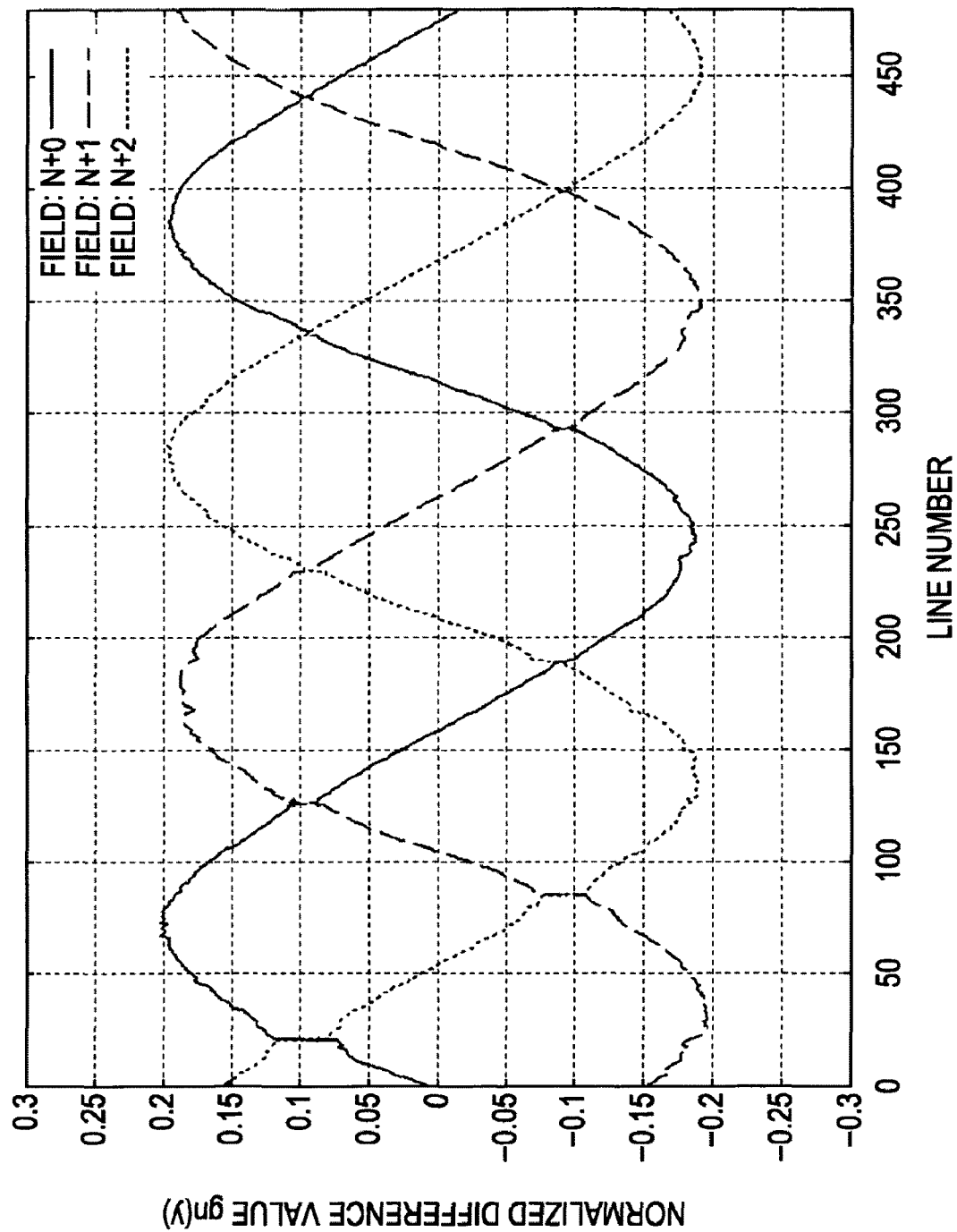
FIG. 20 is a diagram showing normalized difference values in the case of the subject in FIG. 17.

FIG. 20 shows normalized difference values gn(y) in three consecutive fields with respect to the subject shown in FIG. 17.

<Estimation of Flicker Component by Spectrum Extraction>

|Am| and θm respectively represented by Equations (11a) and (11b) in FIG. 13 are the amplitude and initial phase of the spectrum of each order of the normalized difference value gn(y). By performing a Fourier transform on the normalized difference value gn(y) to detect the amplitude |Am| and the initial phase θm of the spectrum of each order, on the basis of Equations (12a) and (12b) in FIG. 14, the amplitude γm and initial phase Φmn of the flicker component of each order represented by Equation (2) in FIG. 11 can be obtained.

Accordingly, in the example of FIG. 5, a DFT block 51 performs a discrete Fourier transform on data equivalent to one wavelength (L lines) of flicker of the normalized difference value gn(y) from the normalizing block 35.

Letting DFT[gn(y)] represent a DFT computation, and Gn(m) represent the DFT result of order m, the DFT computation is represented by Equation (13) in FIG. 14. W in Equation (13) is represented by Equation (14). According to the definition of the DFT, the relationship between Equations (11a) and (11b) and Equation (13) is represented by Equations (15a) and (15b) in FIG. 14.

Therefore, the amplitude γm and initial phase Φmn of the flicker component of each order can be obtained from Equations (12a), (12b), (15a), and (15b) on the basis of Equations (16a) and (16b) in FIG. 14.

The data length of the DFT computation is set to one wavelength (L lines) of flicker because this makes it possible to directly obtain a group of discrete spectrums that is exactly an integer multiple of ωo.

While the FFT (Fast Fourier Transform) is generally used as a Fourier transform for digital signal processing, the DFT is intentionally used in this embodiment of the present invention. The DFT is more convenient than the FFT because the data length of the Fourier transform is not a power of 2. It should be noted, however, that it is also possible to use the FFT by manipulating input/output data.

Under the actual fluorescent lamp lighting, a flicker component can be sufficiently approximated even if the order m is limited to that of several magnitudes. Thus, it not necessary to output all data in the DFT computation, and for the intended application of the present invention, the DFT does not present any disadvantages in terms of operation efficiency in comparison to the FFT.

It is also possible for the DFT block 51 to extract the spectrum through the DFT computation defined by Equation (13), and then estimate the amplitude γm and initial phase Φmn of the flicker component of each order through a computation represented by Equations (16a) and (16b).

However, in the video camera according to this embodiment, as described above, by also taking into account cases where a deviation has occurred in flicker component due to tilting, panning, or the like of the video camera, in the DTF block 51, a flicker component is expressed in the complex plane, the flicker component is represented by the imaginary part Im and the real part Re, and this is supplied to the flicker deviation correcting unit realized by the system controller 14.

Then, although will be described later in detail, in the flicker deviation correcting unit realized by the system controller 14, a center-of-gravity calculating block 142 detects a flicker deviation by taking past flicker components in a memory 143 into account, and supplies this to a deviation correcting block 141. The deviation correcting block 141 corrects the flicker component in accordance with the supplied deviation, and then supplies the corrected flicker component to a phase/amplitude extracting block 144.

The phase/amplitude extracting block 144 estimates the amplitude γm and initial phase Φmn of the flicker component of each order by a computation represented by Equations (16a) and (16b), from the flicker component expressed in the complex plane supplied to the phase/amplitude extracting block 144. Thereafter, in a flicker generating block 145, a flicker coefficient Γn(y) represented by Equation (2) in FIG. 11 is computed from the estimated values of γm and Φmn from the phase/amplitude extracting block 144, and this is supplied to a computing block 40 of the flicker reduction unit 25 as shown in FIG. 5.

it should be noted, however, that as described above, the flicker component can be sufficiently approximated under the actual fluorescent lamp lighting even if the order m is limited to that of several magnitudes. Thus, in computing the flicker coefficient Γn(y) by Equation (2), the order of total sum can be set to a predetermined order, such as a second order, rather than infinity.

Figure 21:
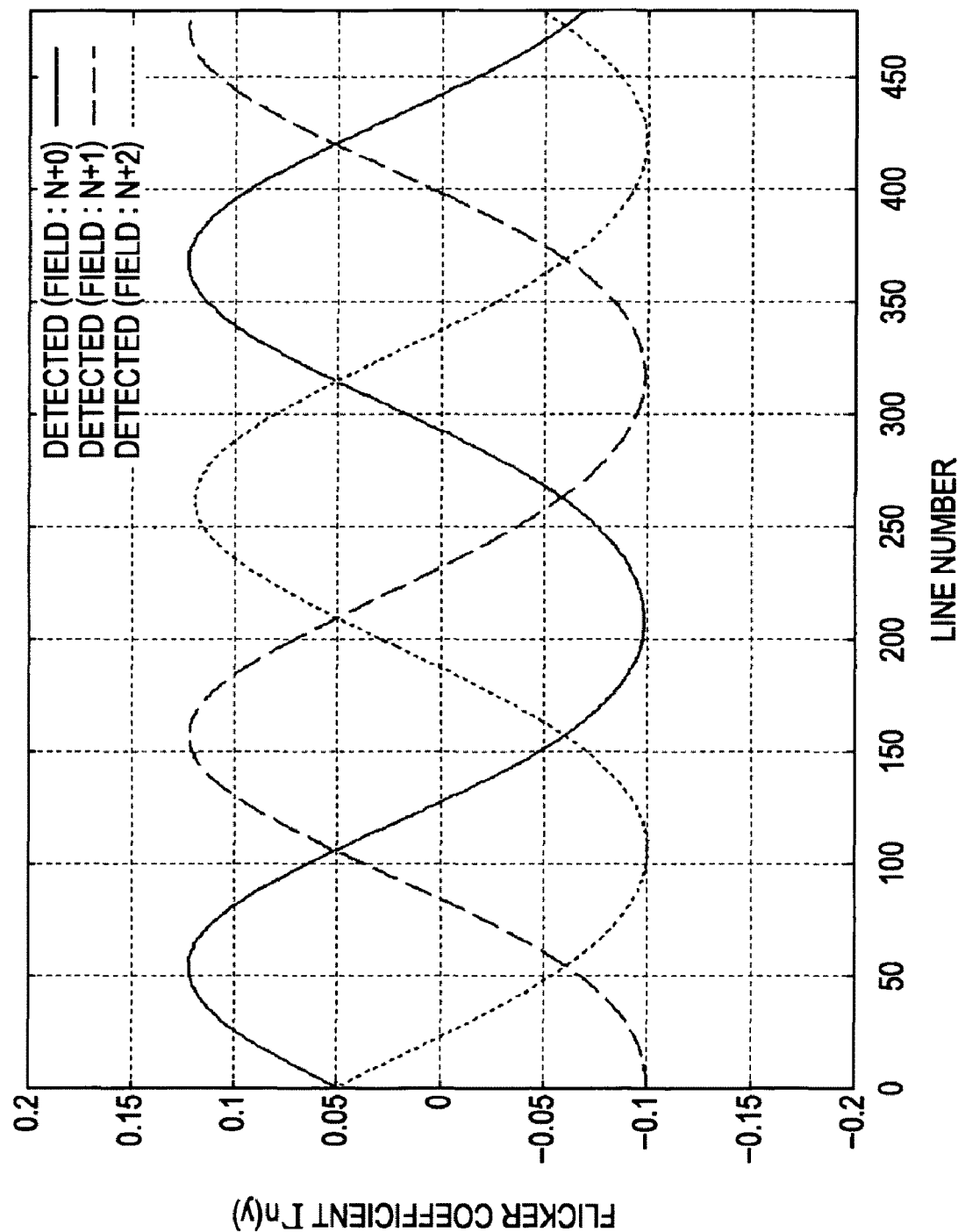
FIG. 21 is a diagram showing estimated flicker coefficients in the case of the subject in FIG. 17.
Figure 22:
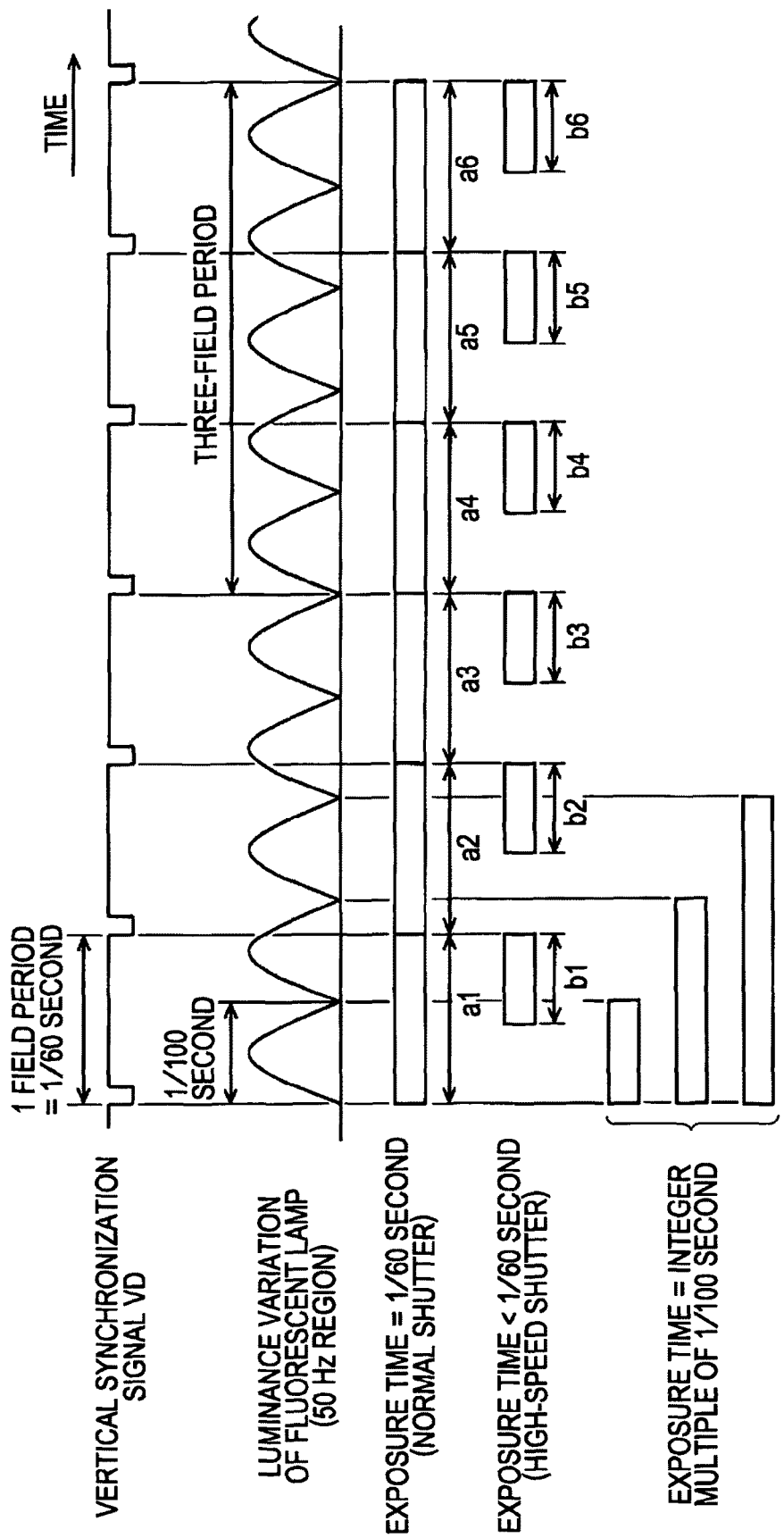
FIG. 22 is a diagram used for explaining fluorescent lamp flicker in the case of a CCD imaging device.

FIG. 21 shows the flicker coefficients Γn(y) of the three consecutive fields of the subject of FIG. 23.

According to the above-mentioned method, even in a region such as a black background part or a low illumination part with a very small amount of flicker component where the flicker component is buried completely in the signal component in the integrated value Fn(y), by computing the difference value Fn(y)–Fn_1(y), and normalizing this by the average value AVE[Fn(y)], the flicker component can be detected with high accuracy.

The estimation of the flicker component from the spectrum to an appropriate order means that the approximation is effected without completely reproducing the normalized difference value gn(y). Thus, even if a discontinuity occurs in the normalized difference value gn(y) depending on the state of a subject, the flicker component in that portion can be estimated with good accuracy.

<Computation for Flicker Reduction>

From Equation (1) in FIG. 11, the signal component In(x, y) containing no flicker component is represented by Equation (17) in FIG. 14.

Accordingly, in the example of FIG. 5, the computing block 40 adds 1 to the flicker coefficient Γn(y) from the flicker generating block 145 that will be also described later, and the input image signal In'(x, y) is divided by the resulting sum [1+Γn(y)].

Thus, the flicker component contained in the input image signal In'(x, y) is almost completely removed, and a signal component In(x, y) containing substantially no flicker component is obtained from the computing block 40, as an output image signal (RGB primary color signal or luminance signal that has undergone flicker reduction).

Figure 6:
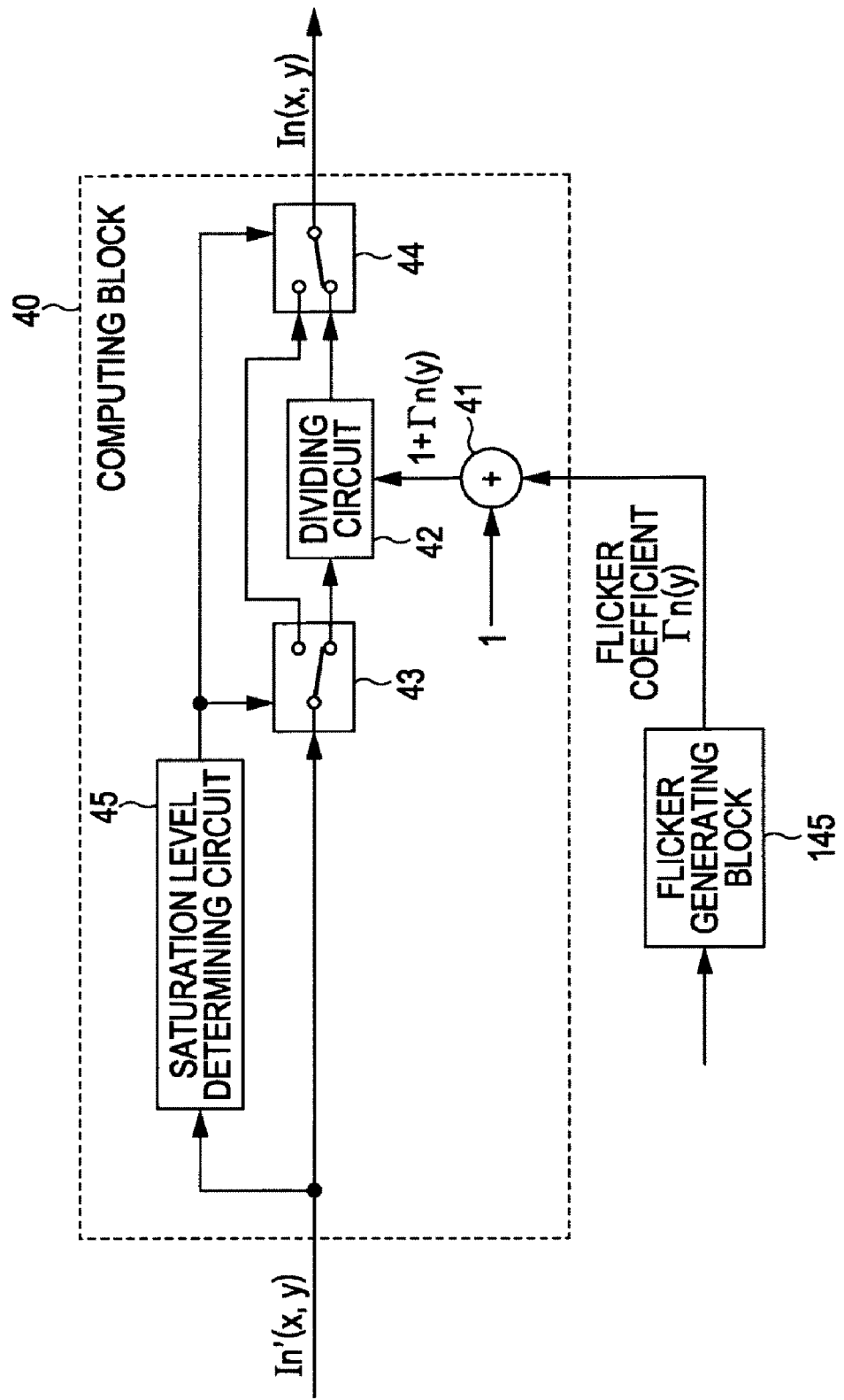
FIG. 6 is a diagram showing an example of a computing block in a case where a saturation region is taken into account.

(Case of Taking Saturation Region into Account: FIG. 6)

In the example of FIG. 5, if the computing block 40 performs the computation represented by Equation (17) with the level of the input image signal In'(x, y) falling within a saturation region, this causes the signal component (color component or luminance component) to vary conversely. Accordingly, the computing block 40 is desirably configured as in the example of FIG. 6.

The computing block 40 in the example of FIG. 6 includes an adding circuit 41 that adds 1 to the flicker coefficient Γn(y) from the flicker generating block 145, a dividing circuit 42 that divides the input image signal In'(x, y) by the resulting sum [1+Γn(y)], a switch 43 on the input side, a switch 44 on the output side, and a saturation level determining circuit 45. The saturation level determining circuit 45 determines on a pixel-by-pixel basis whether the level of the input image signal In'(x, y) is equal to or higher than a threshold level of the saturation region.

If the level of the input image signal In'(x, y) is lower than the threshold level of the saturation region, for the corresponding pixel, the switches 43 and 44 are switched on the dividing circuit 42 side by the saturation level determining circuit 45 and, as described above, the result of the computation in Equation (17) is outputted from the computing block 40 as an output image signal.

In contrast, if the level of the input image signal In'(x, y) is equal to or higher than the threshold level of the saturation region, for the corresponding pixel, the switches 43 and 44 are switched to the opposite side by the saturation level determining circuit 45, and the input image signal In'(x, y) is outputted as it is as an output signal from the computing block 40.

Therefore, when the level of the input image signal In'(x, y) falls within the saturation region, the signal component (color component or luminance component) does not vary, and thus a high-quality output image signal can be obtained.

(Flicker Deviation Correcting Unit: FIG. 4 and FIGS. 7A to 8B)

As shown in FIG. 4, the flicker deviation correcting unit realized by the system controller 14 includes the deviation correcting block 141, the center-of-gravity calculating block 142, the memory 143, the phase/amplitude extracting block 144, and the flicker generating block 145. As shown in FIG. 4, the flicker component detected by the flicker reduction unit 25 is supplied as a value (Im, Re) expressed in the complex plane, to the deviation correcting block 141 and memory 143 of the flicker deviation correcting unit realized by the system controller 14.

Figure 7A:
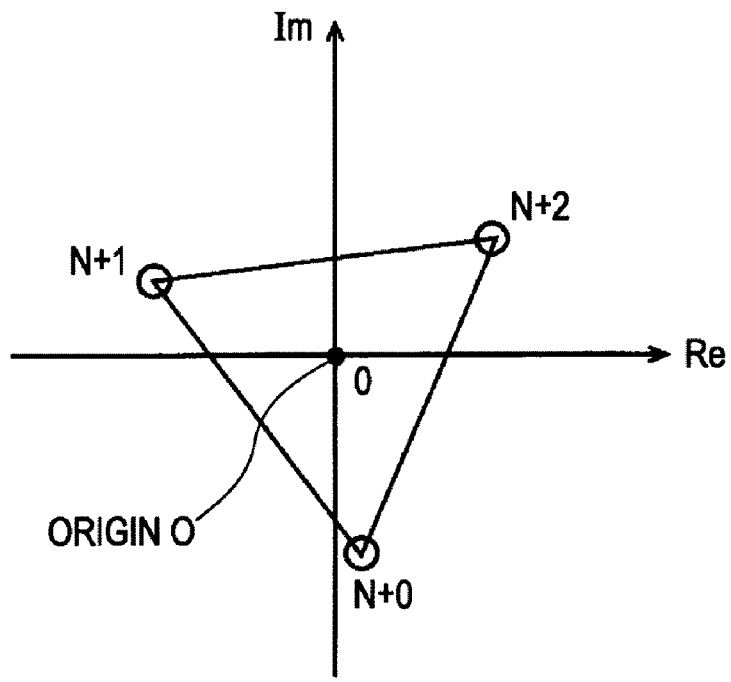
FIGS. 7A and 7B are diagrams each illustrating a case in which flicker components are expressed in the complex plane.
Figure 7B:
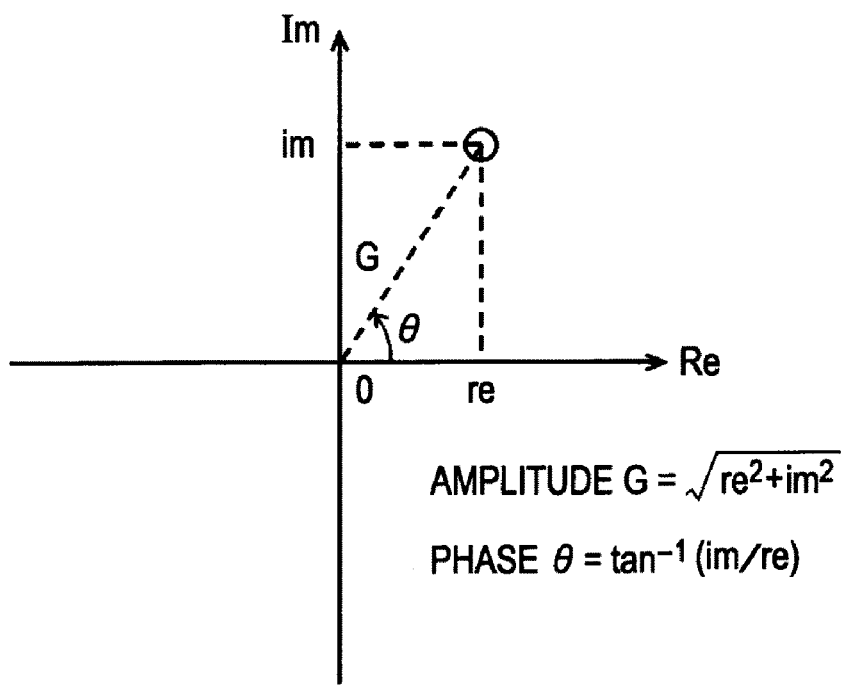

The memory 143 can store and hold flicker components for at least three fields. FIG. 7A is a diagram illustrating an example in which flicker components for three adjacent fields are expressed in the complex plane. FIG. 7B is a diagram illustrating the relationship between the imaginary part Im and the real part Re.

As described above, a flicker component expressed in the complex plane is expressed by the imaginary part Im and the real part Re, and as shown in FIG. 7B, its amplitude G and phase θ can be expressed by the value im of the imaginary part and the value re of the real part.

When there is little motion in the subject to be shot, a large difference does not occur in subject component between adjacent fields. Thus, flicker components in individual fields can be accurately obtained. In this case, plotting the respective flicker components in three adjacent fields (N+0, N+1, and N+2) in the complex plane results in FIG. 7A.

That is, in the case of the video camera according to this embodiment, as described above, three fields serve as one period, which means that the phase difference of flicker component between adjacent fields is $\frac{2}{3}\pi$ (two-thirds of $\pi$=120 degrees). Therefore, as shown in FIG. 7A, when the flicker components in the adjacent fields are plotted in the complex plane, each flicker component becomes a vertex of an equilateral triangle centered about the origin O in the complex plane.

However, as described above, when the video camera according to this embodiment has been tilted or panned by the user, and the image of the subject has greatly changed abruptly, the difference in subject component becomes large between adjacent fields, with the result that a deviation is contained in the extracted flicker component.

Figure 8A:
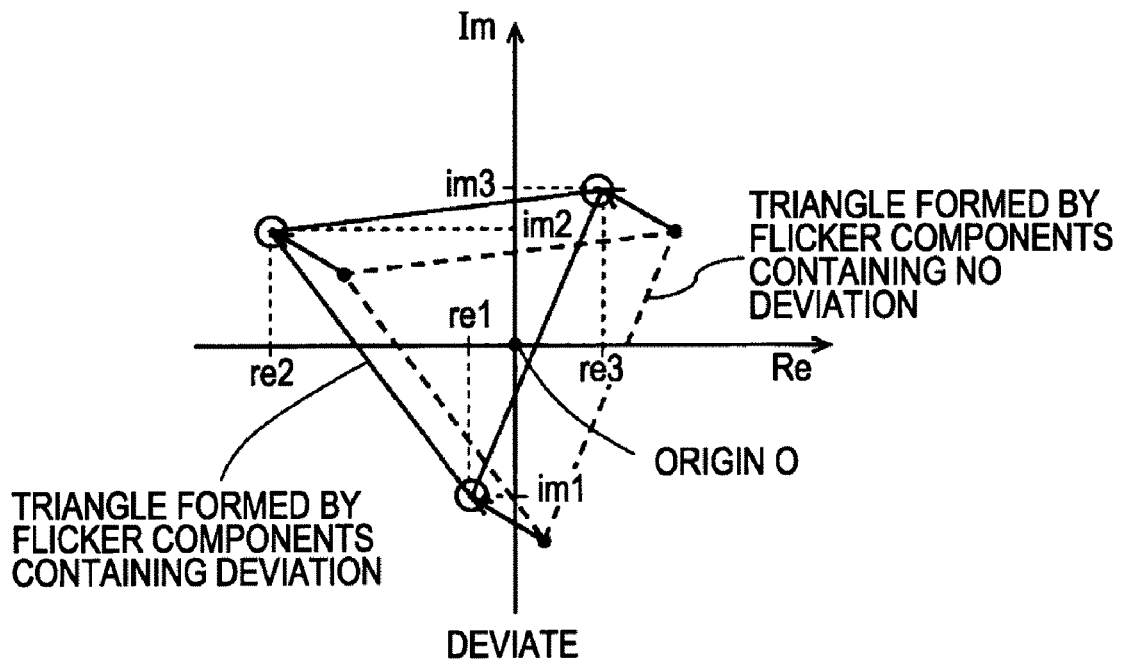
FIGS. 8A and 8B are diagrams each illustrating a case in which flicker components with deviation are plotted in the complex plane.
Figure 8B:
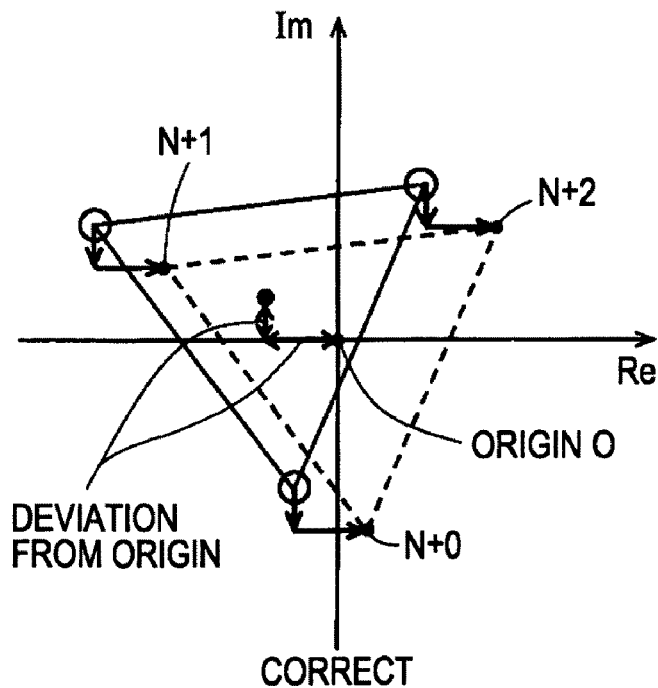

FIGS. 8A and 8B are diagrams illustrating a case where flicker components with deviation are plotted in the complex plane. FIGS. 8A and 8B show a case where a similar deviation occurs in flicker component in each of three adjacent fields due to, for example, a tilt operation or a pan operation.

FIGS. 8A and 8B show a case where the flicker components in individual fields, which should otherwise be located at the respective vertices of the equilateral triangle centered about the origin O as indicated by the dotted lines, deviate as indicated by the arrows. In this case, deviations in the imaginary-axis direction and real-axis direction are obtained by obtaining the average of individual flicker components in each of the imaginary-axis direction and real-axis direction.

That is, if no deviation has occurred, as indicated by the dotted lines in FIG. 8A, the respective flicker components in the three adjacent fields are located at the vertices of the equilateral triangle centered about the origin O. Thus, if the average value is obtained with respect to each of the imaginary-axis direction and the real-axis direction, the average value becomes 0 (zero). However, if a deviation has occurred, when such an average value is obtained, the value does not become 0 (zero), and the obtained average value corresponds to a deviation from the proper flicker component.

Accordingly, in the flicker deviation correcting unit realized by the system controller 14, the center-of-gravity calculating block 142 reads flicker components for the past three fields from the latest field, and obtains the average values in the imaginary-axis direction and the real-axis direction. Specifically, as shown in FIG. 8A, the average value in the imaginary-axis direction can be obtained by dividing the sum of values im1, im2, and im3 by three. Likewise, the average value in the real-axis direction can be obtained by dividing the sum of values re1, re2, and re3 by three.

Then, the average value in the imaginary-axis direction obtained in the center-of-gravity calculating block is the deviation in the imaginary-axis direction indicated by the arrows in the imaginary-axis direction in FIG. 8B, and the average value in the real-axis direction is the deviation in the real-axis direction indicated by the arrows in the real-axis direction in FIG. 8B. The deviations obtained in the center-of-gravity calculating unit 142 in this way are supplied to the deviation correcting block 141.

The deviation correcting block 141 subtracts the deviations from the flicker component in the latest field (the flicker component in the latest field used in the center-of-gravity calculating block 142), thus forming the intended appropriate flicker component (corrected flicker component) Im, Re, and supplies this to the phase/amplitude extracting block 144.

Then, as described above, the phase/amplitude extracting block 144 estimates the amplitude $\gamma m$ and initial phase $\Phi mn$ of the flicker component of each order by a computation represented by Equations (16a) and (16b) shown in FIG. 14, from the corrected flicker component Im, Re supplied from the deviation correcting block 141. The amplitude $\gamma m$ and initial phase $\Phi mn$ of the flicker component of each order thus estimated are supplied to the flicker generating block 145.

As described above, the flicker generating block 145 computes the flicker coefficient $\Gamma n(y)$ represented by Equation (2) in FIG. 11, from the estimated values of $\gamma m$ and $\Phi mn$ supplied from the phase/amplitude extracting block 144, and supplies this to the computing block 40 of the flicker reduction unit 25 as shown in FIG. 4.

As described above, since the signal component In(x, y) containing no flicker component is represented by Equation (17) in FIG. 14 from Equation (1) in FIG. 11, the computing block 40 adds 1 to the flicker coefficient $\Gamma n(y)$ supplied from the flicker generating block 145, and divides the input image signal In'(x, y) by the resulting sum $[1+\Gamma n(y)]$ to obtain the input image signal In(x, y) from which flicker components are removed, and outputs this input image signal In(x, y).

In this way, in the case of a video camera, there are cases when a difference occurs in subject component between adjacent fields due to a tilt operation, a pan operation, an abrupt movement of a subject, or the like, and thus a deviation occurs in the flicker component that is detected for each field. However, the video camera according to this embodiment can appropriately detect and correct a deviation occurring in the flicker component. Therefore, flicker components can be removed from an image signal with high accuracy.

Also, as described above, the flicker reduction unit 25 that assumes a case where the motion of a subject is large may simply hold integrated values over at least three fields in the integrated value holding block 32, and compute the average value of the integrated values over at least four fields including the integrated value Fn(y) of the current field. Even in a case where a deviation that is too large to be canceled out in this way is mixed in the flicker component, such a large deviation can be effectively removed by the function of the flicker deviation correcting unit realized by the system controller 14.

It should be noted that as previously described with reference to FIG. 5, a flicker component is obtained for each field by using the integrated values in three consecutive fields. Therefore, a deviation in flicker component between adjacent fields does not necessarily become constant. However, as described above, by obtaining the average value across three adjacent fields, it is possible to appropriately detect a deviation (correction amount) with respect to the flicker component of the field to be corrected, and correct the deviation.

That is, even when a difference occurs in subject component between adjacent fields due to a tilt operation, a pan operation, or the like, and thus a deviation occurs in the flicker component that is obtained for each field, it is possible to appropriately detect the deviation, and accordingly correct the flicker component in each field appropriately.

If it is not possible to complete all of the above-mentioned processes within the time of one field due to constraints on the computational capability of the system, a configuration may be adopted in which, by taking advantage of the fact that flicker is repeated every three fields, a function of holding the flicker coefficient Γn(y) over three fields is provided within the calculating block 40, and the held flicker coefficient Γn(y) is computed with respect to the input image signal In'(x, y) three fields later.

Figure 9:
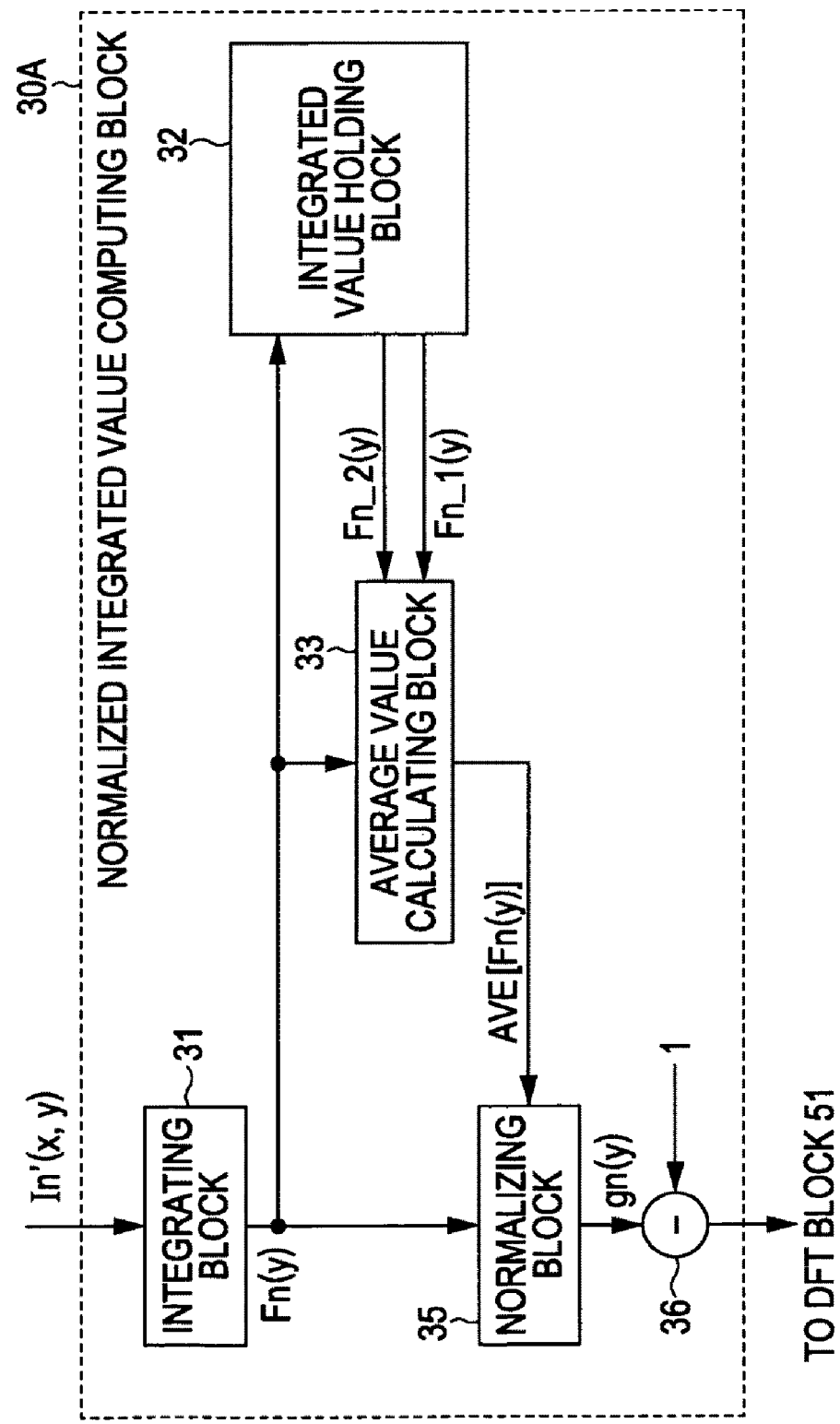
FIG. 9 is a diagram illustrating another configuration example of a normalized integrated value computing block of a flicker reduction unit.

(Another Configuration Example of Normalized Integrated Value Computing Block 30 of Flicker Reduction Unit 25)
(Second Configuration Example of Normalized Integrated Value Computing Block: FIG. 9)

If the difference value Fn(y)−Fn_1(y) is normalized by the average value AVE[Fn(y)] as in a normalized integrated value computing block 30 shown in FIG. 5, a finite calculation accuracy can be effectively ensured. However, if the requisite calculation accuracy can be satisfied, the integrated value Fn(y) may be directly normalized by the average value AVE [Fn(y)].

FIG. 9 shows a normalized integrated value computing block 30A in this case. In the normalizing block 35, the integrated value Fn(y) from the integrating block 31 is normalized by being divided by the average value AVE[Fn(y)] supplied from the average value calculating block 33, thereby computing the normalized difference value gn(y).

It should be noted, however, that the normalized difference value gn(y) in this case is as represented by Equation (18) in FIG. 15. Thus, to make processes in subsequent stages identical to those in the example of FIG. 5, as represented by Equation (19) in FIG. 15, a subtracting circuit 36 subtracts 1 from the normalized difference value gn(y) represented by Equation (18), and transmits the resulting value to the DFT block 51.

In this case, since |Am|=γm and θm=Φmn, γm and Φmn can be obtained from Equations (20a) and (20b) in FIG. 15 from Equations (15a) and (15b) in FIG. 14.

Therefore, in the example in FIG. 5, the amplitude γm and initial phase Φmn of the flicker component of each order are estimated by the computation of Equations (16a) and (16b) after extracting the spectrum by the DFT computation defined by Equation (13), whereas in the example in FIG. 9, the amplitude γm and initial phase Φmn of the flicker component of each order are estimated by the computation of Equations (20a) and (20b) after extracting the spectrum by the DFT computation defined by Equation (13). The processes after the estimation of the amplitude γm and initial phase Φmn of the flicker component of each order, that is, the processes in the flicker generating block 145 and the computing block 40 are the same as those in the cases described above with reference to FIGS. 4 and 5.

Since the difference calculating block 34 is unnecessary in the example in FIG. 9, the normalized integrated value computing block can be simplified accordingly. In this example as well, the computing block 40 is desirably configured as in the example in FIG. 6.

(Third Configuration Example of Normalized Integrated Value Computing Block: FIG. 10)

If the approximation defined by Equation (7) in FIG. 12 holds, the average value AVE[Fn(y)] used for the normalization in the example of FIG. 5 is equal to αn(y) as represented by Equation (6). Also, since the second term [αn(y)*Fn(y)] in Equation (4) in FIG. 11 is sufficiently small in comparison to the first term αn(y), the second term exerts only a very small influence on the normalization.

Therefore, for the normalization, there is practically no problem in using the integrated value Fn(y) instead of the average value AVE[Fn(y)]. The flicker component can be effectively detected in the same manner as when the average value AVE[Fn(y)] is used.

Accordingly, in the example of a normalized integrated value computing block 30B according to a third example shown in FIG. 10, the difference value Fn(y)−Fn_1(y) from the difference calculating block 34 is normalized in the normalizing block 35 by being divided by the integrated value Fn(y) supplied from the integrating block 31. The subsequent processes are the same as those in the example of FIG. 5.

In the example in FIG. 10, it suffices for the integrated value holding block 32 to be able to hold the integrated value for one field, and the average value calculating block 33 is unnecessary. The flicker reduction unit 25 can be thus simplified. In this example as well, the computing block 40 is desirably configured as in the example in FIG. 6.

(Others)

In the case of shooting under non-fluorescent lamp lighting (under a lighting environment not using a fluorescent lamp), no particular problem occurs when the above-described flicker reduction process is performed. However, since a process that is otherwise unnecessary is performed in this case, even if the flicker component is sufficiently small, its influence on image quality becomes a concern.

Accordingly, in the case of shooting under non-fluorescent lamp lighting, the flicker reduction unit 25 or the flicker deviation correcting unit realized by the system controller 14 is desirably configured in such a way that the flicker reduction process is not executed, and the input image signal In'(x, y) is outputted from the flicker reduction unit 25 as it is as an output image signal.

For example, a fluorescent-lamp-lighting-condition determining block is arranged between the phase/amplitude extracting block 144 of the flicker deviation correcting unit realized by the system controller 14 shown in FIG. 4, and the flicker generating block 145.

Figure 16A:
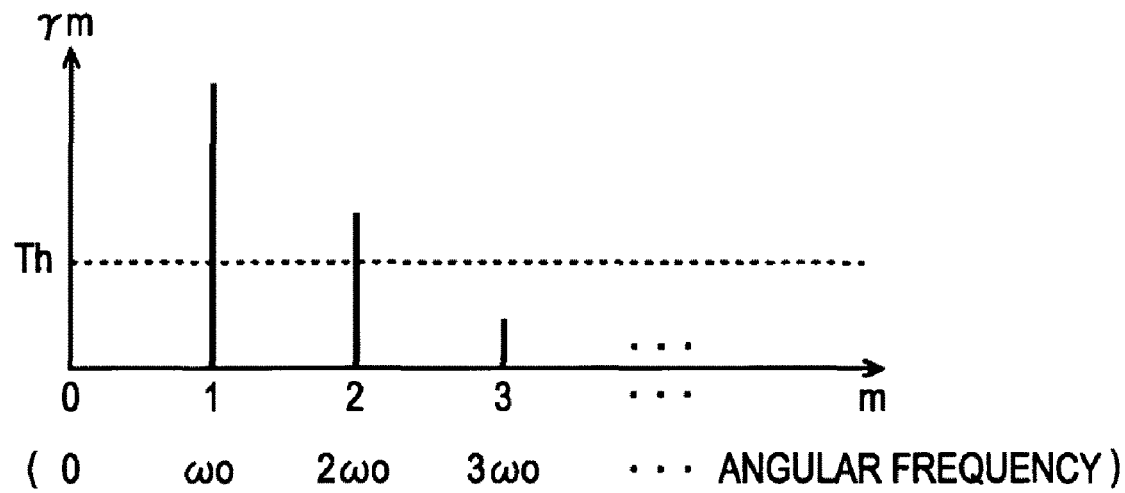
FIGS. 16A and 16B are diagrams used for explaining respective examples.

As for the level (amplitude) γm of the component of each order estimated and computed by the phase/amplitude extracting block 144, under fluorescent lamp lighting-conditions, as shown in FIG. 16A, the level of the component when m=1 is sufficiently higher than a given threshold Th, and the level becomes sharply lower as the value of m becomes larger.

Figure 16B:
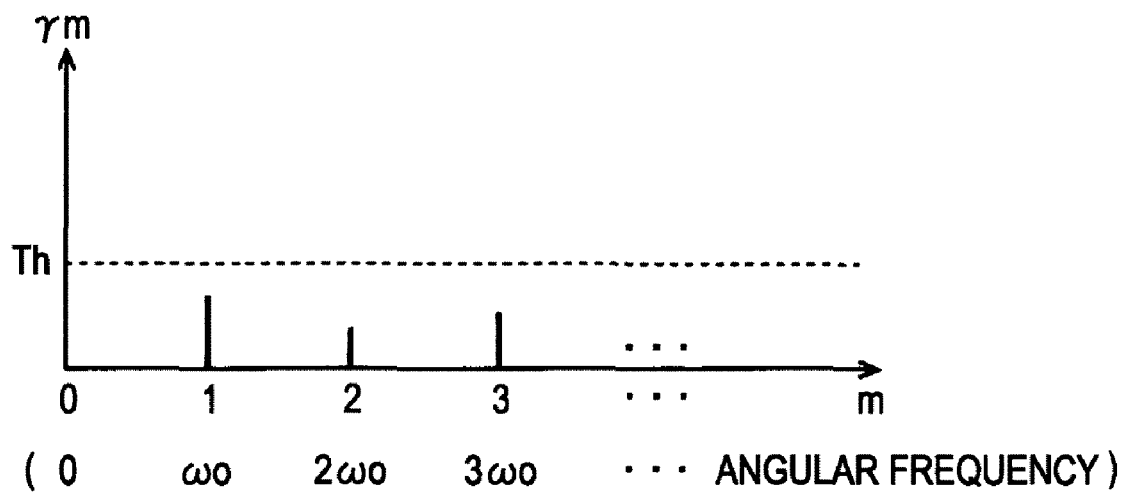

In contrast, under non-fluorescent lamp lighting, the level of the component at each order is lower than the threshold Th as shown in FIG. 16B.

Ideally, the spectrum becomes zero under non-fluorescent lamp lighting. In practice, however, the subject moves, so the normalized difference value gn(y) or the normalized integrated value gn(y)−1 generated from the signals of a plurality of consecutive fields inevitably contains a small amount of frequency component.

Accordingly, the fluorescent-lamp-lighting-condition determining block arranged between the phase/amplitude extracting block 144 and the flicker generating block 145 determines whether or not the level of a component at m=1 exceeds the threshold Th. If the level at m=1 exceeds the threshold Th, the fluorescent-lamp-lighting-condition determining block determines that shooting is being done under fluorescent lamp lighting, and outputs the estimated values of γm and Φmn from the phase/amplitude extracting block 144 to the flicker generating block 145 as they are. In this case, the flicker reduction process is executed as described above.

If the level of the component at m=1 is equal to or lower than the threshold Th, the fluorescent-lamp-lighting-condition determining block determines that shooting is being done under non-fluorescent lamp lighting, and sets the estimated value of γm of all order m to zero. Therefore, in this case, the flicker coefficient Γn(y) also becomes zero, and the input image signal In'(x, y) is outputted as an output image signal as it is from the computing block 40.

Also, as another example, the fluorescent-lamp-lighting-condition determining block determines whether or not shooting is being done under fluorescent lamp lighting, and if it is determined that shooting is being done under non-fluorescent lamp lighting, the fluorescent-lamp-lighting-condition determining block sets a detection flag COMP_OFF, stops the processing in the flicker generating block 145 and the computing block 40, and outputs the input image signal In'(x, y) as an output image signal as it is from the computing block 40. A configuration may be also adopted in which if shooting is being done under fluorescent lamp lighting, the detection flag COMP_OFF is reset, and the flicker reduction process is executed as described above.

In this way, in the case of a configuration in which the on/off of the flicker generating block 145 and the computing block 40 can be controlled in accordance with the result of determination by the fluorescent-lamp-lighting-condition determining block, when shooting under non-fluorescent lamp lighting, not only an adverse influence on image quality can be eliminated, but also power consumption can be reduced.

(Example of Performing Another Process Depending on Shooting Condition)

As will be discussed below, the flicker reduction process may become unnecessary depending on the shooting condition. In this case, considering an influence on image quality, it is desirable not to perform a flicker reduction process that is otherwise unnecessary, as in the case of the shooting under non-fluorescent lamp lighting described above.

A first example of shooting conditions in which no flicker reduction process is necessary is a case where a still image is to be shot with a video camera or a digital still camera that can shoot both a moving image and a still image.

In this case, even with a camera using an XY address scanning type imaging device such as a CMOS imaging device, the exposure timings (including exposure start timings and exposure end timings) of all of the pixels on one screen can be made the same, thus making it possible to avoid occurrence of fluorescent lamp flicker. Since a read operation from the imaging device is not subject to the frame-rate constraint as that imposed when shooting a moving image, the read operation can be performed slowly in a light-blocked state with a mechanical shutter closed.

In the embodiment shown in FIG. 1, the system controller 14 can determine, on the basis of a camera operation on the operating unit 18a, whether or not the current condition corresponds to the case of shooting a still image by making the exposure timings of all of the pixels on one screen the same.

A second example of shooting conditions in which no flicker reduction process is necessary is a case where shooting is to be done outdoors under sunlight, or a case in which the exposure time (electronic shutter time) is set to an integer multiple of the period (1/100 second) of luminance variation of a fluorescent lamp by adjusting the amount of exposure or the like.

Whether or not shooting is being done under fluorescent lamp lighting can be detected from the level of the spectrum extracted by the DFT block 51. In this regard, among shooting conditions under the same non-fluorescent lamp lighting, in a case where shooting is done outdoors under sunlight or the like, the system controller 14 can directly determine from the amount of light of a subject or the like that shooting is being done under non-fluorescent lamp lighting.

As described above, even in the case of a camera using an XY address scanning type imaging device such as a CMOS imaging device, fluorescent lamp flicker including on-screen flicker does not occur when the exposure time is set to an integer multiple of the period (1/100 second) of luminance variation of a fluorescent lamp. Then, whether or not the exposure time has been set to an integer multiple of the period of luminance variation of a fluorescent lamp by adjusting the exposure amount or the like can be directly detected by the system controller 14.

Accordingly, the system is configured such that if it is determined by the system controller 14 that no flicker reduction process is necessary under the current shooting condition as described above, the flicker reduction process is not executed, and the input image signal In'(x, y) is outputted as an output image signal as it is from the flicker reduction unit 25. In this way, it is possible to prevent a flicker reduction process from being performed even in cases where such a flicker reduction process is unnecessary.

Other Embodiments (Integration)

In each of the above-described examples, the input image signal In'(x, y) is integrated over one line. However, since the input image signal In'(x, y) is integrated in order to obtain a sampling value of flicker component while reducing the influence of the picture pattern, the integration may be performed over not only one line but also a plurality of lines. As described above, one period of fluorescent lamp flicker (on-screen flicker) appearing as a stripe pattern on the screen corresponds to L (=M*60/100) lines. Accordingly, if at least two sampling values are obtained in one period, i.e., L lines, the flicker component can be detected from the sampling theorem.

In practice, several to 10 or more sampling values are desirably obtained in one period, i.e., L lines of on-screen flicker. In that case as well, the input image signal In'(x, y) can be integrated over a duration of time equal to several to 10 times or more of the horizontal period. The integration time may not necessarily be exactly an integer multiple of the horizontal period, and may be, for example, 2.5 horizontal periods.

If the integration time is prolonged in this way and the number of samplings per unit time is reduced, the load imposed by the DFT computation on the DFT block 51 can be lightened. In addition, when a subject moves in the vertical direction of the screen, the influence of such motion can be reduced.

(Others)

In the case of the primary color system as shown in FIG. 2, instead of detecting and reducing a flicker component for each of the RGB primary color signals by the flicker reduction units 25R, 25G, and 25B as in FIG. 2, for example, a configuration may be adopted in which the flicker reduction unit 25 as in the above-described example is provided on the output side of the luminance signal Y of the synthesis matrix circuit 29 to thereby detect and reduce a flicker component in the luminance signal Y.

The above-described embodiments are directed to a case where the digital signal processing unit 20 including the flicker reduction unit 25 is configured by hardware. However, a part or whole of the flicker reduction unit 25 or digital signal processing unit 20 or, further, the functions of individual blocks of the flicker deviation correcting unit realized by the system controller 14 may be configured by software.

That is, the flicker reduction unit 25, or the functions of the individual blocks of the flicker deviation correcting unit realized by the system controller 14 shown in FIG. 4 can be realized by software. It should be noted that the configuration examples shown in FIGS. 4 and 5 are merely exemplary, and other configurations may of course be employed. For example, the configuration can be flexibly modified, such as by implementing the function of the DFT 51 as the function of the flicker deviation correcting unit, or providing the flicker generating block 145 in the flicker reduction unit 25.

The above-described embodiments are directed to a case where the vertical synchronization frequency is 60 Hz (with one field period being equal to 1/60 second). However, the present invention is applicable to a progressive type camera, such as a digital camera, having a vertical synchronization frequency of 30 Hz (with one frame period being 1/30 second). In this case, since three frame periods (1/10 second) are an integer multiple (the stripe pattern of flicker equals 10 wavelengths over three frames) of the emission period (1/100 second) of a fluorescent lamp, the fields in the above-described embodiments may be replaced by frames.

Also, the above-described embodiments are directed to a case where, by using an imaging apparatus of the NTSC system with a vertical synchronization frequency of 60 Hz (with one field period being 1/60 second), shooting is done under the lighting of a fluorescent lamp in a region where the commercial AC power supply frequency is 50 Hz. In this case, a brightness variation (flicker) of an approximately 60/100=1.67 periods occurs within one field. As for the way in which this flicker appears (variation pattern), the flicker has a period of three frames. Therefore, in this case, flicker components expressed in the complex plane in the three individual fields are held in advance, and the average of the flicker components is obtained, thereby making it possible to compute a deviation of flicker component.

Likewise, in a case where, by using an imaging apparatus of the PAL (Phase Alternation by Line) system, shooting is done under the lighting of a fluorescent lamp in a region where the commercial AC power supply frequency is 60 Hz, the flicker pattern has a period of five frames. The present invention is applicable to such a case as well.

Specifically, when obtaining a deviation of flicker component, the average of flicker components for five frames expressed in the complex plane may be obtained. That is, when flicker components for five individual frames are plotted in the complex plane, if there is no deviation, an equilateral pentagon centered about an origin and having the flicker components in the five individual frames located at the vertices is formed. Thus, a deviation from the origin of this equilateral pentagon is computed.

Therefore, by identifying the variation pattern of flicker in accordance with the imaging period or the lighting frequency, and identifying the number of fields or the number of frames for which the average of flicker components is to be obtained, in accordance with this variation pattern, the present invention can be applied to whatever combination of the imaging period and lighting frequency.

The above-described embodiments are directed to a case where the present invention is applied to an imaging apparatus. In this case, an image signal with reduced flicker components can be recorded onto a recording medium. However, the present invention is not limited to this. There are also cases when an image signal containing flicker components is recorded onto a recording medium because shooting has been done by using an imaging apparatus to which an embodiment of the present invention is not applied.

In such cases, a configuration may of course be adopted in which as described above with reference to FIGS. 4 to 6, at the stage of reproducing the image signal, the image signal to be reproduced is used as an input image signal, and the flicker reduction process according to an embodiment of the present invention is performed on this image signal. In this case, for an image signal obtained by shooting, the flicker component is reduced at the time of its reproduction, thereby making it possible to provide a good reproduced image. In this case, the flicker component reduction process may be performed on a luminance signal, or by forming three primary color signals from an image signal to be reproduced, the flicker component reduction process may be performed on each of the primary color signals.

It has been described with reference to the above-described embodiments that the flicker reduction process can be performed on each of the three primary color signals (R, G, B) as shown in FIG. 2, or the flicker reduction process can be performed on the luminance signal Y and each of the three primary color signals (R, G, B). However, the present invention is not limited to this.

As shown in FIG. 1, the flicker reduction process may be performed for each luminance signal and color difference signal that constitute a video signal SV, by the flicker reduction unit configured as shown in FIG. 4 to which an embodiment of the present invention is applied. Alternatively, the flicker reduction process may be performed by the flicker reduction unit configured as shown in FIG. 4, at least with respect to the luminance signal Y. Then, the flicker reduction process according to an embodiment of the present invention may be performed also with respect to the color difference signal and respective color signals.

Further, the present invention is also applicable to a case where an XY address scanning type imaging device other than a CMOS imaging device is used.

In the above-described embodiments, integrating means is realized by the integrating block 31, normalizing means is realized by the normalizing block 35, extracting means and estimating means are realized by the DFT block 51, detecting means is realized by the memory 143 and the center-of-gravity calculating block 142, correcting means is realized by the deviation correcting block 141, and computing means is realized by the computing block 40. Further, the imaging device is realized by the CMOS imaging device 12 shown in FIG. 1.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
integrating means for integrating an input image signal over an interval of time equal to or longer than one horizontal period, the input image signal being a video signal that can possibly contain a flicker component with a variation pattern synchronized with a field period or a frame period;
normalizing means for normalizing an integrated value obtained by the integrating means, or a difference value in the integrated value obtained by the integrating means between adjacent fields or frames;
extracting means for extracting a spectrum of the integrated value or the difference value normalized by the normalizing means;
estimating means for estimating a flicker component on a field-by-field basis or a frame-by-frame basis from the spectrum extracted by the extracting means;
detecting means for detecting a deviation of the latest flicker component, from the latest flicker component estimated by the estimating means and one or more flicker components estimated in the past by the estimating means;
correcting means for correcting the latest flicker component on the basis of the deviation of the flicker component detected by the detecting means; and
computing means for computing a corrected flicker component and the input image signal so as to cancel out the flicker component corrected by the correcting means,
wherein:
the estimating means estimates the flicker component in a complex plane; and
the detecting means detects, as the deviation of the latest flicker component, a deviation from an origin in the complex plane which is represented by an average value in an imaginary-axis direction and an average value in a real-axis direction of flicker components of individual fields, or flicker components of individual frames within the variation pattern synchronized with the field period or the frame period.

2. The image processing apparatus according to claim 1, wherein each of three primary color signals of an R (red) signal, a G (green) signal, and a B (blue) signal is used as the input image signal.

3. A flicker reduction method comprising the steps of:
integrating an input image signal over an interval of time equal to or longer than one horizontal period, the input image signal being a video signal that can possibly contain a flicker component with a variation pattern synchronized with a field period or a frame period;
normalizing an integrated value obtained by the integration, or a difference value in the integrated value obtained by the integration between adjacent fields or frames;
extracting a spectrum of the normalized integrated value or difference value;
estimating a flicker component on a field-by-field basis or a frame-by-frame basis from the extracted spectrum;
detecting a deviation of the latest flicker component, from the estimated latest flicker component and one or more flicker components estimated in the past;
correcting the latest flicker component on the basis of the detected deviation of the flicker component; and
computing an estimated flicker component and the input image signal so as to cancel out the corrected flicker component,
wherein:
the estimating step estimates the flicker component in a complex plane; and
the detecting step detects, as the deviation of the latest flicker component, a deviation from an origin in the complex plane which is represented by an average value in an imaginary-axis direction and an average value in a real-axis direction of flicker components of individual fields, or flicker components of individual frames within the variation pattern synchronized with the field period or the frame period.

4. An imaging apparatus comprising:
an imaging device of an XY address scanning type;
integrating means for integrating an input image signal over an interval of time equal to or longer than one horizontal period, the input image signal being a video signal obtained by shooting a subject by the imaging device;
normalizing means for normalizing an integrated value obtained by the integrating means, or a difference value in the integrated value obtained by the integrating means between adjacent fields or frames;
extracting means for extracting a spectrum of the integrated value or the difference value normalized by the normalizing means;
estimating means for estimating a flicker component on a field-by-field basis or a frame-by-frame basis from the spectrum extracted by the extracting means;
detecting means for detecting a deviation of the latest flicker component, from the latest flicker component estimated by the estimating means and one or more flicker components estimated in the past by the estimating means;
correcting means for correcting the latest flicker component on the basis of the deviation of the latest flicker component detected by the detecting means; and
computing means for computing an estimated flicker component and the input image signal so as to cancel out the flicker component corrected by the correcting means,
wherein:
the estimating means estimates the flicker component in a complex plane; and
the detecting means detects, as the deviation of the latest flicker component, a deviation from an origin in the complex plane which is represented by an average value in an imaginary-axis direction and an average value in a real-axis direction of flicker components of individual fields, or flicker components of individual frames within the variation pattern synchronized with the field period or the frame period.

5. An image processing apparatus comprising:
an integrating unit configured to integrate an input image signal over an interval of time equal to or longer than one horizontal period, the input image signal being a video signal that can possibly contain a flicker component with a variation pattern synchronized with a field period or a frame period;
a normalizing unit configured to normalize an integrated value obtained by the integrating unit, or a difference value in the integrated value obtained by the integrating unit between adjacent fields or frames;

an extracting unit configured to extract a spectrum of the integrated value or the difference value normalized by the normalizing unit;

an estimating unit configured to estimate a flicker component on a field-by-field basis or a frame-by-frame basis from the spectrum extracted by the extracting unit;

a detecting unit configured to detect a deviation of the latest flicker component, from the latest flicker component estimated by the estimating unit and one or more flicker components estimated in the past by the estimating unit;

a correcting unit configured to correct the latest flicker component on the basis of the deviation of the flicker component detected by the detecting unit; and a computing unit configured to compute a corrected flicker component and the input image signal so as to cancel out the flicker component corrected by the correcting unit, wherein:

the estimating unit is configured to estimate the flicker component in a complex plane; and the detecting unit is configured to detect, as the deviation of the latest flicker component, a deviation from an origin in the complex plane which is represented by an average value in an imaginary-axis direction and an average value in a real-axis direction of flicker components of individual fields, or flicker components of individual frames within the variation pattern synchronized with the field period or the frame period.

6. An imaging apparatus comprising:

an imaging device of an XY address scanning type;

an integrating unit configured to integrate an input image signal over an interval of time equal to or longer than one horizontal period, the input image signal being a video signal obtained by shooting a subject by the imaging device;

a normalizing unit configured to normalize an integrated value obtained by the integrating unit, or a difference value in the integrated value obtained by the integrating unit between adjacent fields or frames;

an extracting unit configured to extract a spectrum of the integrated value or the difference value normalized by the normalizing unit;

an estimating unit configured to estimate a flicker component on a field-by-field basis or a frame-by-frame basis from the spectrum extracted by the extracting unit;

a detecting unit configured to detect a deviation of the latest flicker component, from the latest flicker component estimated by the estimating unit and one or more flicker components estimated in the past by the estimating unit;

a correcting unit configured to correct the latest flicker component on the basis of the deviation of the latest flicker component detected by the detecting unit; and a computing unit configured to compute an estimated flicker component and the input image signal so as to cancel out the flicker component corrected by the correcting unit, wherein:

the estimating unit is configured to estimate the flicker component in a complex plane; and the detecting unit is configured to detect, as the deviation of the latest flicker component, a deviation from an origin in the complex plane which is represented by an average value in an imaginary-axis direction and an average value in a real-axis direction of flicker components of individual fields, or flicker components of individual frames within the variation pattern synchronized with the field period or the frame period.

* * * * *